United States Patent [19]
Yamamoto et al.

[11] Patent Number: 4,991,204
[45] Date of Patent: Feb. 5, 1991

[54] ADAPTIVE ROUTING CONTROL METHOD

[75] Inventors: Hisao Yamamoto; Kenichi Mase, both of Tokyo; Akiya Inoue, Iruma; Hiroo Itou, Musashino; Masato Suyama; Yoshitaka Hoshi, both of Tokyo, all of Japan

[73] Assignee: Nippon Telegraph and Telephone Corporation, Tokyo, Japan

[21] Appl. No.: 433,949

[22] Filed: Nov. 9, 1989

[30] Foreign Application Priority Data

Dec. 5, 1988 [JP] Japan .................................. 63-307474
Apr. 18, 1989 [JP] Japan .................................... 1-98297

[51] Int. Cl.⁵ ........................ H04Q 3/54; H04M 7/06; H04M 3/36
[52] U.S. Cl. .................................. 379/221; 379/113; 340/827
[58] Field of Search ....................... 379/113, 221, 230; 340/827

[56] References Cited
U.S. PATENT DOCUMENTS 4,284,852 8/1981 Szybicki et al. ..................... 379/221
4,788,721 11/1988 Krishnan et al. ............... 379/113 X Primary Examiner—Stafford D. Schreyer
Attorney, Agent, or Firm—Pollock, Vande Sande and Priddy

[57] ABSTRACT

In a telecommunications network in which a plurality of switching nodes are interconnected via links each composed of a plurality of trunks and are each connected to a network control center via a control signal link, the network control center determines for each switching node a predetermined number of alternate routes for each first route on the basis of traffic data in the telecommunications network and supplies them as a set of available alternate routes to the switching node. The switching node assigns one or more of the available alternate routes in advance. The switching node responds to a call-connection request to try to connect the call to the first route, and when having failed in the call connection, the switching node retries the call connection through one of the assigned routes.

28 Claims, 15 Drawing Sheets

| FIRST ROUTE | SET OF AVAILABLE ALTERNATE ROUTES | CURRENTLY ASSIGNED ALTERNATE ROUTES |
|---|---|---|
| L12 | R132, R142, R152 | R142, R152 |
| L13 | R123, R143 | R143 |
| L14 | R134, R154, R164 | R134, R154, R164 |
| L15 | R145, R125 | R125 |
| L16 | R126, R146 | R126 |

FIG. 5

| ASSIGNED ALTERNATE ROUTE | RELEASE TIME OF UNAVAILABLE STATUS |
|---|---|
| R134 | 20 : 10 : 30 |
| R154 | 20 : 10 : 05 |
| R164 | 00 : 00 : 00 |

FIG. 7

| AVAILABLE ALTERNATE ROUTE | NUMBER OF IDLE TRUNKS | CHOICE PROBABILITY |
|---|---|---|
| R134 | 3 | 0.3 |
| R154 | 5 | 0.5 |
| R164 | 2 | 0.2 |

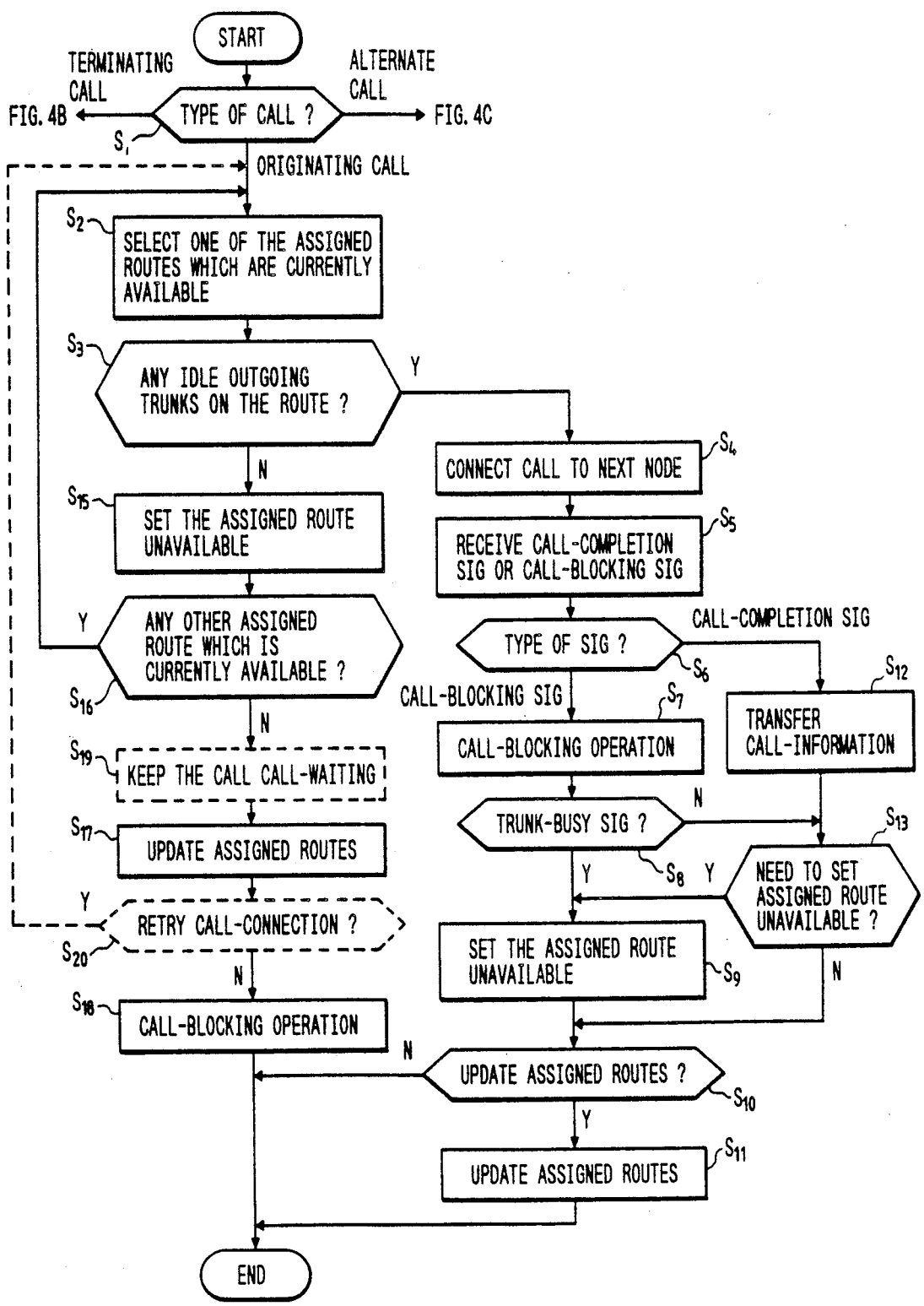

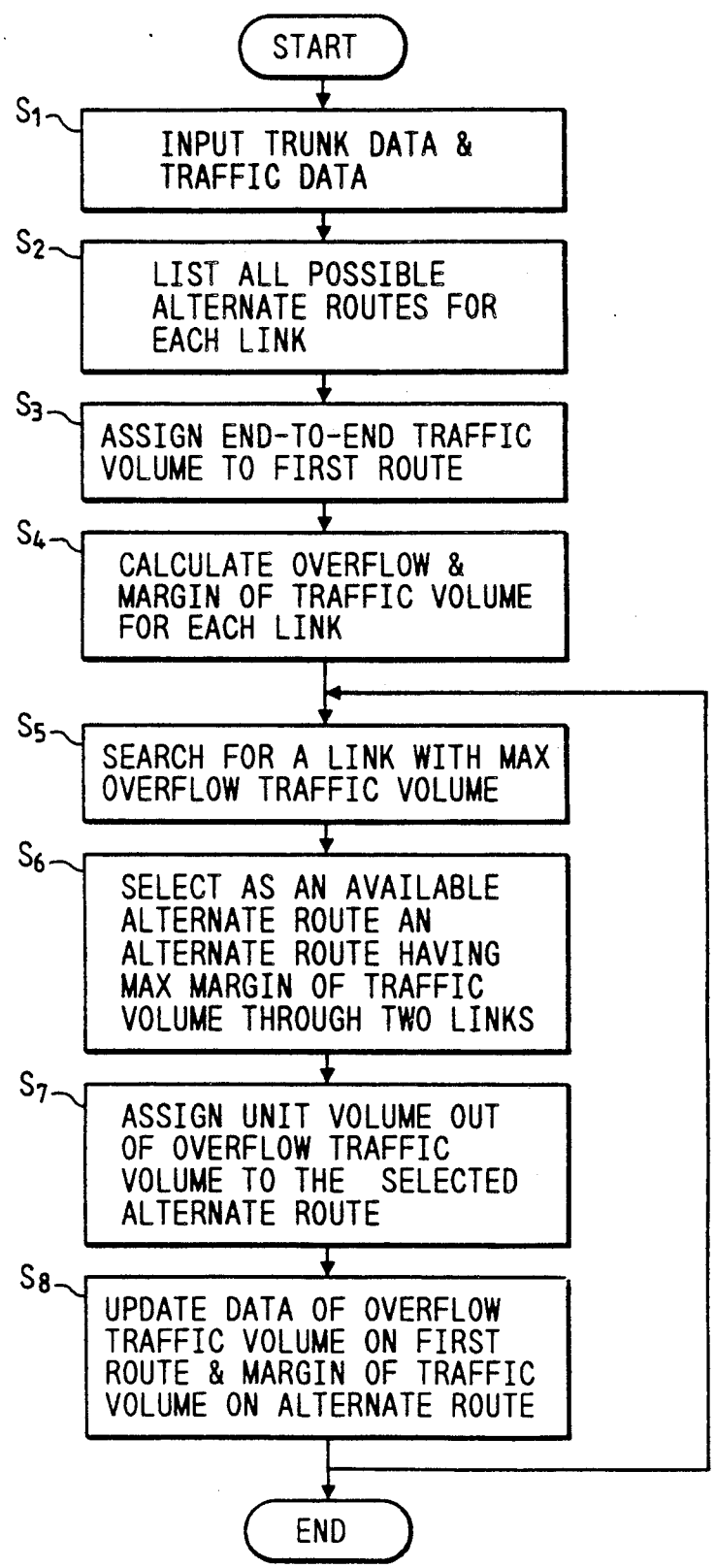

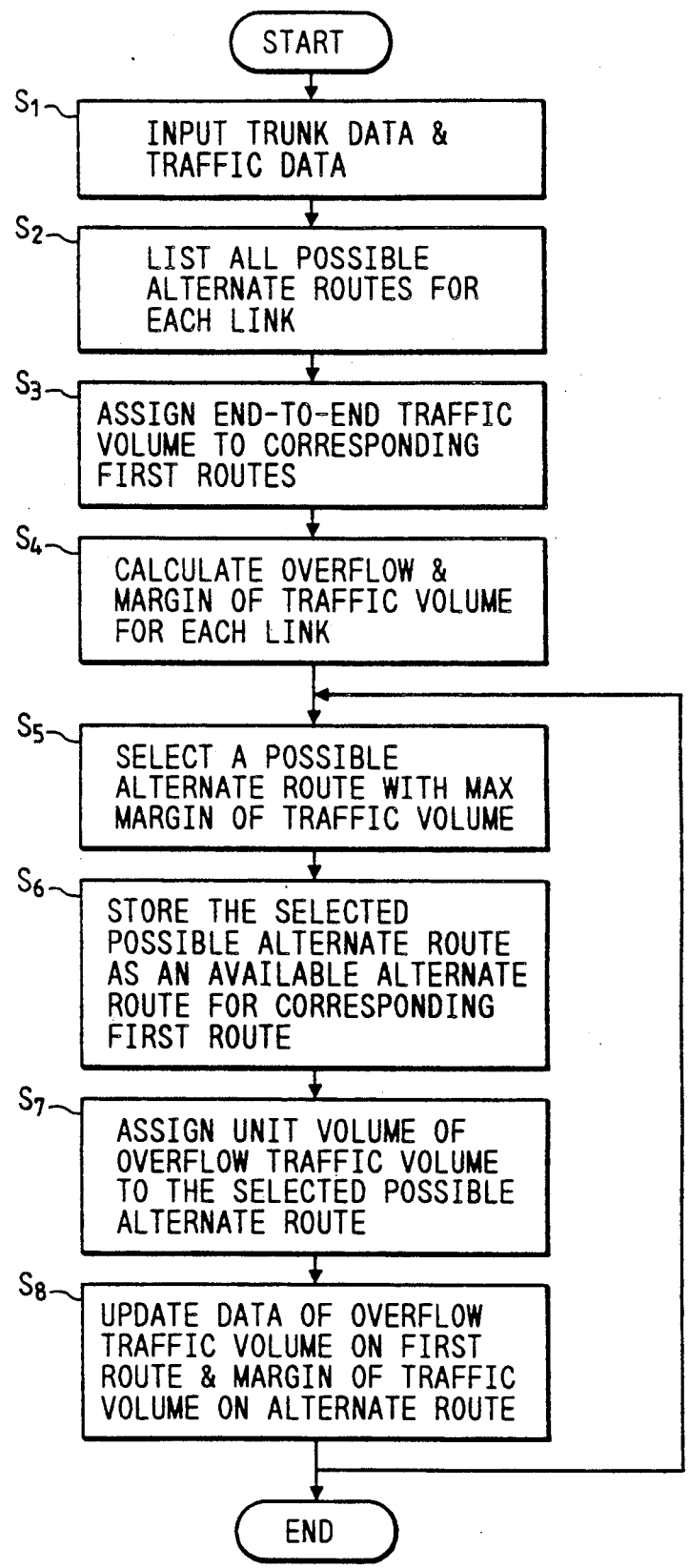

ADAPTIVE ROUTING CONTROL METHOD

BACKGROUND OF THE INVENTION

The present invention relates to a route selection method for telecommunications networks and, more particularly, to an adaptive routing control method which permits optimum routing according to the network status (trunk usage, offered traffic volume, or congestion conditions).

In telecommunications networks with a plurality of switching nodes routes for interconnecting them usually include a first route which achieves the most economical call connection between each originating-terminating node pair. When the first route is not busy, the first route is used to interconnect the originating and terminating nodes, whereas when the first route is busy, alternates routes can be established via one or more other switching nodes. With such a conventional route selection algorithm, however, switching nodes through which alternate routes can be established are limited and the order of their selection also is fixed because of technical restrictions inherent to the call-connection control system employed.

With the recent introduction of switching nodes of a stored program control system and a common channel signaling inter-office system for an inter-office signal transfer, it has become possible to utilize, in place of the above-mentioned route selection algorithm, a dynamic routing method which affords flexible routing based on the distribution of idle trunks in the network.

The dynamic routing method may be classified into time-dependent routing and state-dependent routing (see B. R. Hurley, et al., "A Survey of Dynamic Routing Methods for Circuit Switched Traffic," IEEE COMMUNICATIONS MAGAZINE, Vol. 25, No. 9, pp. 13-21, September 1987, for example).

The time-dependent routing is a method in which a suitable routing pattern is preset for each predetermined time slot, i.e. a method in which a set of alternate routes and the order of their selection are preset for each first route and a call originating in a switching node is connected to the intended destination node, following the routing pattern preset for the time slot concerned. A typical example of the time-dependent routing is a DNHR (Dynamic Nonhierarchical Routing) system proposed by AT & T, Inc. of the United States (see G. R. Ash, et al., "Design and Optimization of Networks with Dynamic Routing," BSTJ, Vol. 60, pp. 1787-1820, October 1981, for instance).

The state-dependent routing is a method which performs a call connection while updating the routing pattern in real time in accordance with the network status such as trunk usage in the network. This method is implemented by centralized or distributed control.

In the state-dependent routing method by centralized control a network control center collects data about the trunk usage throughout the network, calculates a routing pattern between each originating-terminating node pair, and indicates the routing pattern to each switching node in real time. An example of this state-dependent routing method by centralized control is a TSMR system proposed by AT & T, Inc. of the United States and a DCR system by Northern Telecom of Canada (see the afore-mentioned literature by B. R. Hurley, et al., for instance).

In the state-dependent routing method by distributed control each switching node independently detects the network status and autonomously searches for an alternate route based on the network status information, thereby setting an appropriate routing pattern between an origin-destination node pair. Examples of this method are those proposed by British Telecommunications of Great Britain and Centre National D'etudes des Telecommunications of France (commonly known as "CENT"). Both methods are common in basic principle, and the method by British Telecommunications is called a DAR system (see B. R. Stacey, et al., "Dynamic Alternative Routing in the British Telecom Trunk Network," International Switching Symposium, ISS-87, B12.4.1-B.12.4.5, 1987, or Hennion B., "Feedback Methods for Calls Allocation on the Crossed Traffic Routing," International Teletraffic Congress, ITC-9, pp. HEENNION-1 to HENNION-3, 1979, for example).

Some proposals have been made so far for the dynamic routing as mentioned above but they have the following problems yet to be solved for practical use.

(i) The time-dependent routing of the aforementioned DNHR system, for instance, would work well in a country like the United States where a plurality of standard times are used, the traffic busy hour differs sharply with regions, an appropriate routing pattern for each time slot can be forecast, and updating of the routing pattern can be scheduled. Where the traffic busy hour is common almost all over the country as in Japan, however, the time-dependent routing, if used singly, would not be so effective. In a country like Japan it is of prime importance to efficiently handle offered traffic, quickly responding to an excess or shortage of the trunk-number of transit links which is caused by restrictions on the management of trunk resources such as the trunk assignment interval, the trunk modularity, etc. or unpredictable traffic variations, and the state-dependent routing is more effective rather than the time-dependent routing.

(ii) In general, the state-dependent routing by centralized control permits efficient routing, because a routing pattern can be indicated based on the optimization of the entire network through observation of its status, for example, the trunk usage in the network. However, in the case where the observation cycle is long or an information transfer delay occurs, that is, where a time lag is great between the observation and the execution of a call connection by a routing pattern based on the observation, the state of the network varies during this time resulting in an increase in the probability of effecting erroneous control. This will not produce the intended effect and will lower the call-connection quality.

To avoid such a problem and hence achieve the intended effect, it is necessary to reduce the network status observation cycle and the switching node control cycle. The aforementioned TSMR or DCR system, for example, premises that both cycles are within 10 seconds. In a large-scale telecommunications network in which the number of switching nodes to be controlled is several hundreds and the number of links to be measured is as large as tens of thousands, however, such a high-speed observation and control are difficult. In other words, the amount of data to be processed by the network control center, the amount of data to be transferred between the switching nodes and the network control center, and measurements in the switching nodes and the amount of data to be transmitted and received among them are enormous and the facilities therefor are also vast, resulting in an uneconomical system. In addition, a failure in the control center of such a large-scale network will throw the network into disorder.

(iii) With the a aforementioned DAR system and the self-routing system in the state-dependent routing by distributed control, no network control center is employed and each switching node checks the status of alternate routes by a signal handled in its call-connection procedure and autonomously changes an alternate route accordingly, thereby implementing a preferably rerouting pattern throughout the telecommunications network. Consequently, the problem mentioned above in (ii) can be avoided. In a large-scale telecommunications network, however, the number of alternate routes for each origin-destination node pair becomes appreciable, incurring various disadvantages. For instance, in a telecommunications network which forms a mesh by 100 switching nodes the number of alternate routes via two transit links between each origin-destination node pair alone is as large as 98.

In such an instance, (a) alternate routes are rechecked through a search by trial and error prior to a call-connection procedure, and consequently, when the number of available alternate routes is unnecessarily large, the search is repeated inevitably many times until a routing pattern updated according to temporary traffic variations is restored to its initial state. Similarly, when a traffic pattern throughout the network changes or transmission equipment breaks down, the search is repeated many times until each switching node shifts to a new favorable routing pattern. This will deteriorate the call-connection quality and increase the amount of data to be processed by each switching node. (b) An increase in the amount of data managed by each switching node calls for an increase in the number of tables for processing data and the number of counters for counting the number of calls. That is to say, the amount of data which is managed for each origin-destination node pair or each first route increases, and consequently, alternate route tables are required and the state of alternate routing must be monitored from the viewpoint of network management. This necessitates a number of counters for counting the number and the traffic volume of alternate calls and the transit-call-completion probability in each alternate route. Moreover, (c) an increase in the number of counters used will cause an increase in the computer running time to be processed for measurement by the counters.

SUMMARY OF THE INVENTION

It is therefore an object of the present invention to provide an adaptive routing control method which obviates the above-mentioned defects of the prior art, enables an optimum alternate route to be selected in accordance with real time traffic variations and the current network conditions (which consist of a network topology and a matrix of the number of trunks between each node pair), and affords the reduction of the amount of data to be managed by each switching node and the number of tables and counters used even in a large-scale telecommunications network.

To attain the above objective, in the telecommunications network to which the adaptive routing control method of the present invention is applied, a plurality of switching nodes are interconnected via links each composed of a plurality of trunks, one or more routes each composed of a set of one or more links are present between each node pair, and at least one network control center is connected via a control signal link to each switching node. According to the present invention, the network control center adaptively determines, for each node pair, a set of available routes each composed of one or more routes which are set available in accordance with the traffic volume in the telecommunications network and the number of trunks set for each link. The network control center sends the sets of available routes to each switching node and, at a predetermined time, updates the set of available routes and resends them to each switching node. Each switching node responds to a call-connection request to select one of the available routes and performs a required call-connection procedure.

BRIEF DESCRIPTION OF THE DRAWINGS

FIG. 5 is a table II showing available or unavailable status of assigned alternate routes;

FIG. 7 is a table III showing the numbers of idle trunks recorded for respective alternate routes and their choice probabilities determined in accordance with them;

FIG. 8 is a flowchart showing another example of the call-connection procedure in the originating node according to the routing control method of the present invention;

FIG. 11 is a flowchart showing an example of the procedure for determining the sets of available alternate routes;

FIG. 13 is a flowchart showing another example of the procedure for determining the sets of available alternate routes;

DESCRIPTION OF THE PREFERRED EMBODIMENTS

Figures 1, 3:
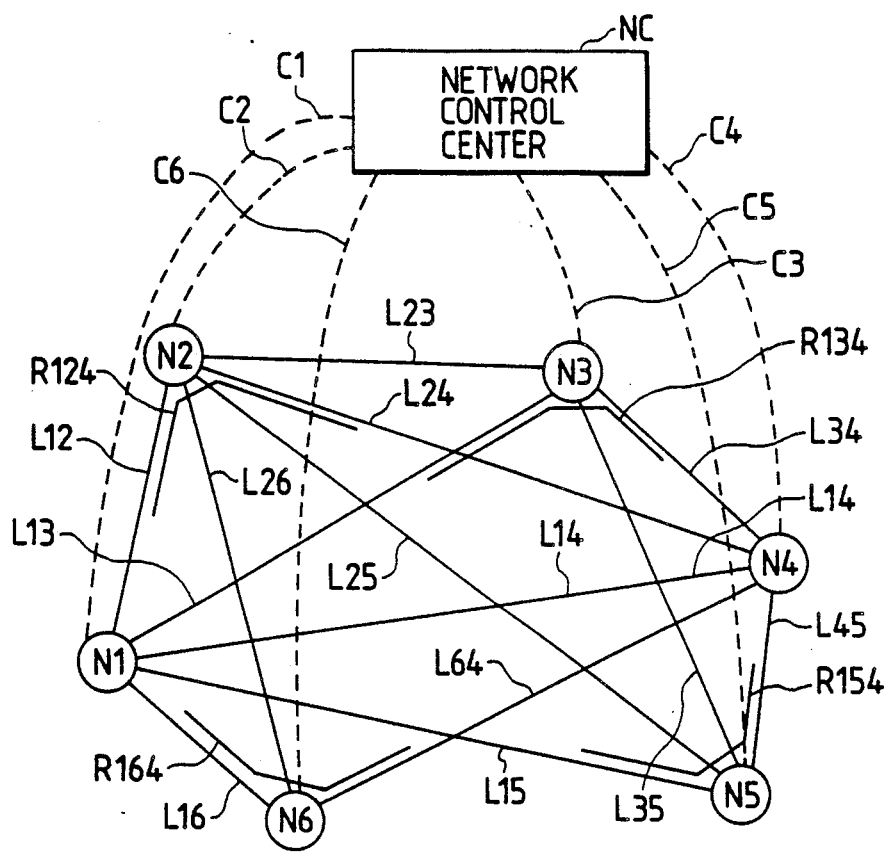
FIG. 1 is a schematic diagram illustrating an example of the telecommunications network to which the adaptive routing control method of the present invention is applied.
FIG. 3 is a table I showing sets of available alternate routes for respective first routes and currently assigned routes, provided to a switching node N1 in the telecommunications network depicted in FIG. 1.

In FIG. 1 there is shown the general constitution of the telecommunications network embodying the adaptive routing control method of the present invention. A plurality of switching nodes N1 to N6 are interconnected via solid-line links L12, L23, ... to form various routes. The links L12, L23, ... each include a preset number of trunks. A network control center NC is provided in association with these switching nodes N1 to N6. The switching nodes N1 to N6 are connected to the network control center NC via broken-line control signal links C1 to C6, respectively. The switching nodes N1 to N6 each possess the functions of an originating node which originates a call, a transit node which relays the call, and a terminating node which is the destination of the call.

Now, definitions will be given of some terms which will be used in the following description of embodiments of the present invention.

First Route: A predetermined route which connects two arbitrary switching nodes for a call-connection. When there is one link which directly connects the two switching nodes, it is used as the first route, and when such a link is not found, a predetermined route is used as the first route which connects them via one or more other switching nodes (i.e. transit nodes).

Possible Routes: Routes through which two arbitrary switching nodes can be connected in the communications network shown in FIG. 1. In the description of the present invention they are defined as routes, each formed by a maximum of two links.

Set of Available Routes: One or more routes selected by the network control center from all the possible routes.

Alternate Routes: Possible routes except the first route.

Outgoing Link: A link from which a call is sent out from each switching node.

First and Second Alternate Links: A link which connects an originating and a transit node over an alternate route will be referred to as a first alternate link. A link which connects the transit node and a terminating node will be referred to as a second link.

Set of Available Alternate Routes: One or more alternate routes preselected by the network control center from all alternate routes for the first route which connects two arbitrary switching nodes.

In the embodiment of the present invention which is applied to the telecommunications network depicted in FIG. 1 the network control center NC predetermines, for each time slot, sets of available alternate routes which are used by the switching nodes N1 to N6, respectively, and transfers the predetermined sets of available alternate routes to the switching nodes N1 to N6 at predetermined times. The switching nodes N1 to N6 each respond to a call-connection request to preferentially search the first route for an idle trunk, and when no idle trunk is found in the first route, the switching node tries a call-connection via an alternate route adaptively selected, in accordance with the trunk usage, from the set of available alternate routes transferred from the network control center NC. In the following description a link which directly connects two arbitrary switching nodes Ni and Nj (where i and j are positive integers, which are not equal to each other) will be identified by Lij and a route which connects the two switching nodes via transit node Nk (where k is a positive integer, which is not equal to the integers i and j) will be identified by Rikj.

Switching Node

Figure 2:
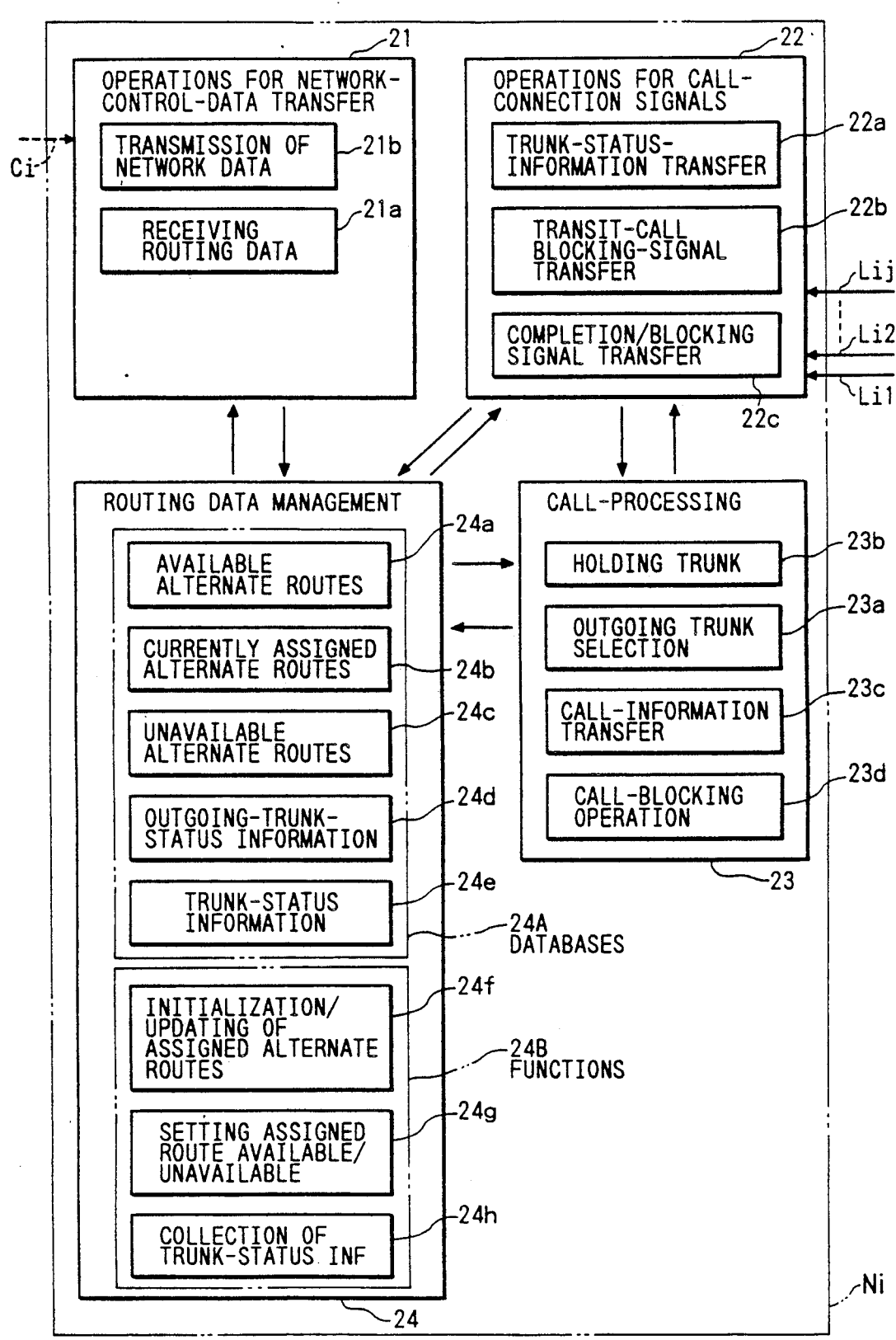
FIG. 2 is a function-block-chart of a network control center NC in the telecommunications network depicted in FIG. 1.

FIG. 2 is a function-block-chart of each of the switching nodes N1 to N6 in the telecommunications network shown in FIG. 1. The switching node Ni performs network-control-data transfer operations 21, call-connection signal processing 22, call processing 23 and routing data management 24. The network-control-data transfer operations 21 includes an operation 21a of receiving routing data, i.e. sets of available alternate routes from the network control center NC via the control signal link Ci and an operation 21b of transmitting network data to the network control center NC via the control signal link Ci. The call-connection signal processing 22 includes: a trunk-status-information transfer operation 22a of receiving trunk status information from other switching nodes or transmitting trunk status information in the switching node Ni via the links Li1, Li2, ... , Lij, ... ; a transit-call-blocking signal transfer operation 22b of sending a transit-call-blocking signal back to an originating node in the case of a failure in the transit-call connection because of no idle trunk being found in the outgoing link of the switching node Ni when it acts as a transit node, or receiving the transit-call-blocking signal from a transit node when the switching node Ni acts as an originating node; and a completion/blocking signal transfer operation 22c of sending the call-completion signal or call-blocking signal to an originating node when the switching node Ni acts as a terminating node, relaying the call-completion signal or call-blocking signal to an originating node when the switching node Ni acts as a transit node, or receiving the call-completion signal or call-blocking signal when the switching node Ni acts as an originating node. The call processing 23 includes: an outgoing trunk selecting operation 23a for connecting a call to an idle trunk of a desired link in response to a call-connection request; a trunk holding operation 23b for performing a call-connection procedure when receiving the call-completion signal from a terminating node; a call-information transfer operation 23c for selecting an appropriate route to the terminating node in response to the call-connection request and a call-blocking operation 23d for performing a call-blocking procedure when the call connection to the intended terminating node in response to a call-connection request has finally been blocked. The routing management 24 has databases 24A and functions 24B. The databases 24A include: available alternate routes 24a, i.e. the aforementioned sets of available alternate routes received from the network control center NC; currently assigned alternate routes 24b selected from the set of available alternate routes 24a; unavailable alternate routes 24c selected from the currently assigned alternate routes 24b; outgoing-trunk-status information 24d indicating the number of trunks provided in each outgoing link of the switching node Ni; and trunk-status information 24e indicating the busy/idle status of the trunks of each link. The functions 24B includes an assigned alternate route initialization/updating function 24f of determining and updating the assigned alternate routes, a function 24g of setting the assigned alternate routes available/unavailable and a trunk-status observing function 24h.

Let it be assumed that the switching nodes, for example, N1 and N4 are an originating and a terminating node in the telecommunications network shown in FIG. 1. In general, the most economical route L14 is selected as the first route, and when no idle trunk is found in the link L14, an alternate route is used. In this instance, possible alternate routes are R134, R164, R124, and R154, but the network control center NC specifies and indicates in advance to the switching node N1 a set of available alternate routes for each first route as shown in Table I of FIG. 3. The available alternate routes to the switching node N4 are routes R134, R154 and R164 which pass through transit nodes N3, N5 and N6, respectively. Based on trunk status information of each outgoing link of the transit nodes N3, N5 and N6 (i.e. the second link of each available alternate route) the switching node N1 selects in advance from the set of available alternate routes at least one route which is expected to be high in the call-completion probability, the alternate route or routes thus selected being assigned as shown in Table I. The switching node N1 selects one of the assigned alternate routes and tries a call connection.

Figure 4A:
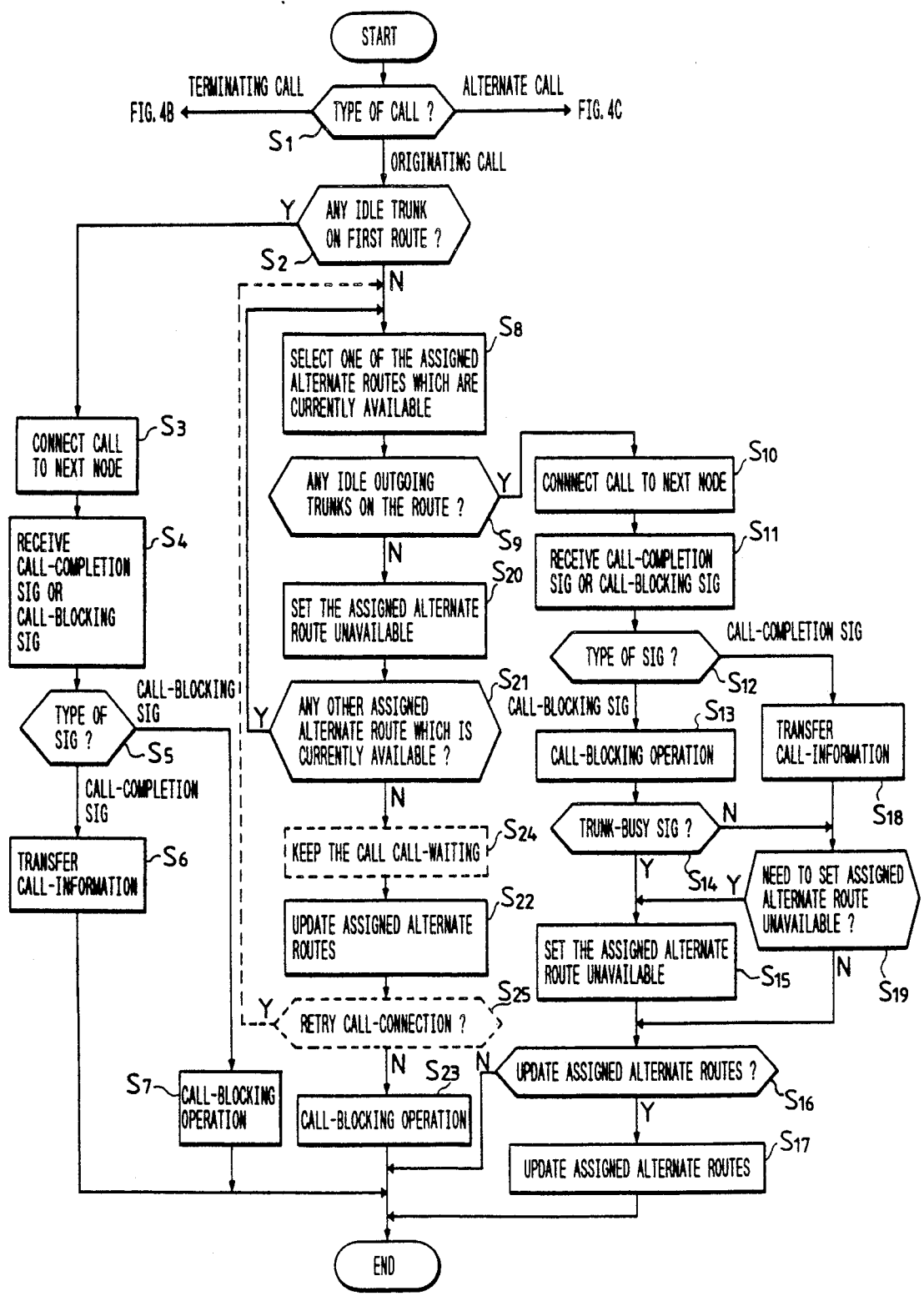
FIG. 4A is a flowchart showing a call-connection procedure in an originating node.
Figure 4B:
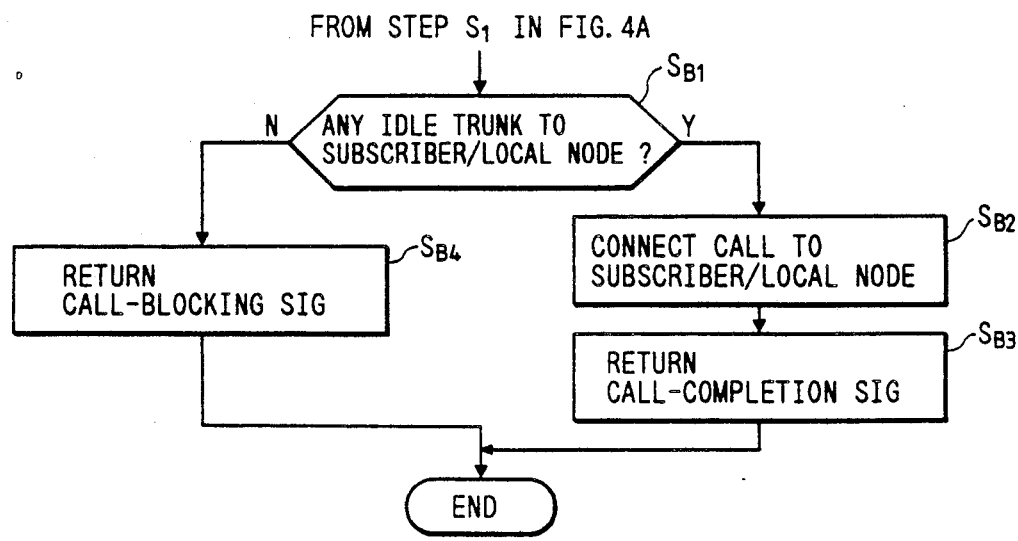
FIG. 4B is a flowchart showing a call-connection procedure in a terminating node.
Figure 4C:
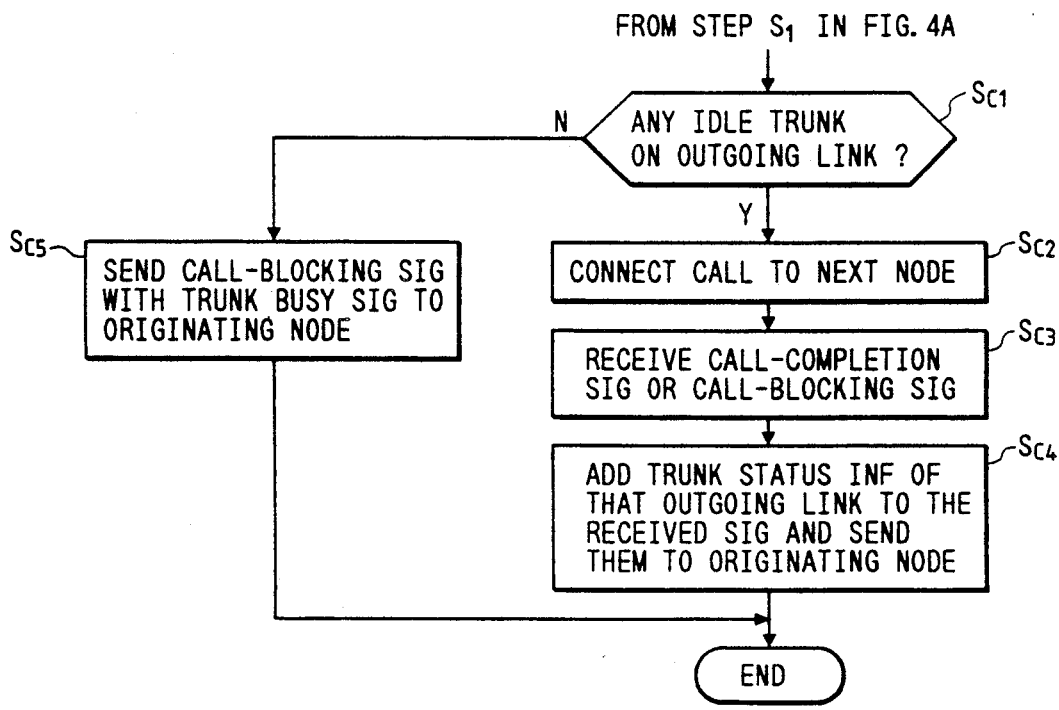
FIG. 4C is a flowchart showing a call-connection procedure in a transit node.

FIGS. 4A, 4B and 4C are flowcharts showing call-connection procedures which each switching node performs, FIG. 4A showing a process flow primarily for an originating node, FIG. 4B a process flow for a terminating node, and FIG. 4C a process flow for a transit node.

In FIG. 4A, upon detection of a call, the switching node identifies the type of the call in step $S_1$, and if it is a terminating call to the switching node, the process shifts to the process flow shown in FIG. 4B. The switching node checks in step $S_{B1}$ whether or not a trunk to a subscriber or local node is idle which is the destination of the call, and if the trunk is idle, the switching node connects the call to the subscriber (or local node) in step $S_{B2}$ and then sends a call-completion signal back to the originating node in step $S_{B3}$. Where the trunk to the subscriber or local node (hereinafter referred to as a subscriber trunk, for the sake of brevity) is busy in step $S_{B1}$, the switching node sends a call-blocking signal back to the originating node in step $S_{B4}$.

Where it is determined in step $S_1$ in FIG. 4A that the call is an alternate call, the switching node performs the processing as a transit node, shown in FIG. 4C. In step $S_{C1}$ it is determined whether there is an idle trunk in the outgoing link to the terminating node which is the destination of the call, and if the idle trunk is found, the call is connected to the terminating node through the idle trunk in step $S_{C2}$. Thus the call is sent to the terminating node, which performs the processing shown in FIG. 4B; namely, the terminating node sends a call-completion or call-blocking signal back to the transit node in step $S_{B3}$ or $S_{B4}$. The transit node receives the call-completion or call-blocking signal from the terminating node in step $S_{C3}$ and, in step $S_{C4}$, sends the received signal to the originating node together with trunk-status information of the aforementioned outgoing link of the transit node. Where no idle trunk is found in the outgoing link in step $S_{C1}$, a call-blocking signal and a transit-call-blocking signal (also referred to as trunk-busy signal) indicating the occurrence of call blocking in the transit node are sent back to the originating node in step $S_{C5}$. The transit-call-blocking signal is used as trunk status information.

Where it is detected in step $S_1$ in FIG. 4A that the call is an originating call, the switching node performs the following processing as an originating node. The following description will be given on the assumption that the switching nodes N1 and N4 are an originating and a terminating node, respectively, as in the above. It is checked in step $S_2$ whether or not there is an idle trunk in the outgoing link L14 which forms the first route to the terminating node, and if an idle trunk is found, the call is connected to the next node via the first route L14 in step $S_3$. Thus the call is sent to the terminating node N4, which performs the processing shown in FIG. 4B and from which a call-completion or call-blocking signal is sent back to the originating node N1 in step $S_{B3}$ or $S_{B4}$. The originating node N1 receives the call-completion or call-blocking signal in step $S_4$ in FIG. 4A, and it is determined in step $S_5$ which signal was received. Where the received signal is the call-completion signal, the originating node N1 transfers call-information to the terminating node N4 in step $S_6$ and completes the call-connection procedure. Where it is determined in step $S_5$ that the received signal is the call-blocking signal, the process terminates with a call-blocking operation in step $S_7$. When no idle trunk is found in step $S_2$, the process proceeds to step $S_8$, wherein an available alternate route, for instance, R134 is selected from the currently assigned alternate routes R134, R154 and R164 for the first route L14, shown in Table I of FIG. 3. Then it is checked whether or not there is an idle trunk in the first alternate link L13 of the selected alternate route R134 in step $S_9$.

In step $S_8$, one of the assigned alternate routes is selected randomly, cyclically, or on a predetermined order basis out of currently assigned alternate routes. There are two methods to determine busy/idle trunk status. One method permits the use of the trunk when there is at least one idle trunk. The other one permits the use of the trunk only when there is a predetermined number of two or more idle trunk. The latter method is employed to give the connection of a call using the link as the first route (which call will hereinafter be referred to as a basic call) high priority over the connection of an alternate call.

If an idle trunk can be found in step $S_9$, the process proceeds to step $S_{10}$, wherein the call is connected to the next node, e.g. a transit node N3. Thus the call is sent to the transit node N3, wherein the process shown in FIG. 4C is performed. The signal sent back from the transit node N3 in step $S_{C4}$ or $S_{C5}$ is received by the originating node N1 in step $S_{11}$, and it is checked in step $S_{12}$ whether the signal received in step $S_{11}$ is a call-connection or call-blocking signal. In the case of the call-blocking signal, the call-blocking operation is performed in step $S_{13}$, and it is checked in step $S_{14}$ whether or not the call-blocking signal is appended with a transit-call-blocking signal, i.e. a trunk-busy signal. The transit-call-blocking signal means that no idle trunk was found in an outgoing link L34 of the transit node N3, and the assigned route R134 which passes through the transit node N3 is set unavailable in step $S_{15}$. Then it is checked in step $S_{16}$ whether or not the currently assigned alternate routes need to be updated, and if so, the currently assigned alternate routes are updated in step $S_{17}$.

The updating of the currently assigned alternate routes in step $S_{16}$ is required in the case (a) where all the currently assigned alternate routes are unavailable, (b) where the number of currently assigned alternate routes set available is smaller than a predetermined value, or (c) where at least one of the currently assigned alternate routes is unavailable. In the case (a), all the currently assigned alternate routes are updated in step $S_{17}$. In the case (b) or (c), all the currently assigned alternate routes or unavailable ones of them need only to be updated in step $S_{17}$. Where it is determined in step $S_{16}$ that no updating is needed, the procedure ends.

When it is determined in step $S_{12}$ that the received signal is the call-completion signal, this means that the call has been connected to an idle trunk of the outgoing link L34 in the transit node N3. In this instance, the call-information is transferred to the terminating node N4 via the transit node N3 in step $S_{18}$, and on the basis of the trunk-status information of the outgoing link L34 in the transit node N3, appended to the received signal, it is checked in step $S_{19}$ whether or not the alternate route R134 needs to be set unavailable. That is to say, in the case where, as a result of the connection of the call to an idle trunk of the outgoing link L34, no more idle trunks exist the number of remaining idle trunks becomes smaller than a predetermined value, or the idle trunk ratio becomes smaller than a predetermined value, the alternate route R134 is set temporarily unavailable in step $S_{15}$, and then the process proceeds to step $S_{16}$. Even if it is determined in step $S_{19}$ that the alternate route R134 need not be set temporarily unavailable, it is checked in step $S_{16}$ whether or not the currently assigned alternate routes need to be updated, because there is the possibility that the number of currently assigned alternate routes becomes smaller than a predetermined value.

When it is determined in step $S_9$ that no idle trunk is found in the first alternate link L13 of the alternate route R134, the currently assigned alternate route R134 is set unavailable temporarily in step $S_{20}$. Then it is checked in step $S_{21}$ whether or not there still remain any other currently assigned alternate routes which are available, and if yes, the process returns to step $S_8$, repeating the processing of steps $S_8$ to $S_{21}$. When it is determined in step $S_{21}$ that the currently assigned alternate routes are all unavailable, they are all updated in step $S_{22}$ and the procedure ends after the call-blocking operation in step $S_{23}$. Incidentally, the updating of the currently assigned alternate routes in step $S_{22}$ is performed by the same operation as used in step $S_{17}$.

When the currently assigned alternate routes are all unavailable in step $S_{21}$, there is another method. In this method, it is possible to keep the call call-waiting in the broken-linked step $S_{24}$, all the currently assigned alternate routes are updated in step $S_{22}$ and then it is determine in the broken-line step $S_{25}$ whether to retry the connection of the call held call-waiting. If it is determined to retry the call-connection, the process goes back to step $S_8$ as indicated by the broken line, trying the call-connection to one of the updated currently assigned alternate routes. If it is determined in step $S_{25}$ not to retry the call-connection, the call-blocking operation is carried out in step $S_{23}$. This improves the call-completion probability. The return of the process from step $S_{25}$ to $S_8$ for retrying the call-connection is limited to only once, for example.

There are two methods of setting the selected alternate route of the currently assigned ones routes temporarily unavailable in step $S_{15}$ in FIG. 4A. First, the currently assigned alternative routes are set unavailable for a predetermined time period from the time set in step $S_{15}$ in the process flow of the originating node (in FIG. 4A) or for a time period determined according to the trunk-status information received from the transit node. Second, the transit node sends back the trunk-status information to the originating node together with information of its observation time in step $S_{C4}$ in the process flow of the transit node (in FIG. 4C) and the originating node sets the currently assigned alternate routes unavailable for a predetermined time period from the trunk-status observation time or for a time period determined according to the trunk-status information. In either, case, the time at which each alternate route is released from the unavailable status is calculated in step $S_{15}$ and is stored as shown in Table II of FIG. 5. In step $S_8$ one of the alternate routes which have already been released from the unavailable status at the current time is selected by referring to Table II of FIG. 5.

The aforementioned trunk-status information which determines the unavailable-status period of the currently assigned alternate routes is, for instance, the number of idle trunks, and the smaller the number of idle trunks, the longer the unavailable-status period is set. For example, when the number of idle trunks is zero, the unavailable-status period is set to 15 seconds, and when two or more trunks are idle, the unavailable-status period is zero seconds. Since the trunk status of links is usually ever-changing, the method of setting the unavailable-status period on the basis of the aforementioned trunk-status observation time is advantageous in that the unavailable-status period of the alternate routes can be set independently of a trunk-status information transfer delay between switching nodes, the waiting time from the observation of the trunk status in the transit node to the transmission of status information, and their variations.

In step $S_{17}$ of FIG. 4A, a required number of new assigned alternate routes are chosen from a set of available alternate routes randomly, in a predetermined cyclic order, or on a predetermined order basis, or alternate routes to be removed from the currently assigned status are set unassignable for a predetermined time period in the same manner as setting the currently assigned alternate routes unavailable as described previously with respect to Table II of FIG. 5 and a required number of new assigned alternate routes are chosen from assignable ones of the set of available alternate routes randomly, in a predetermined cyclic order, or on a prefixed-priority basis.

In the process flow of the originating node described previously in connection with FIG. 4A, one or more available alternate routes selected from the set of available alternate routes specified by the network control center NC are assigned in advance, and in the case of performing alternate routing to comply with a call-connection request, one of the assigned available alternate routes is selected for the call-connection, but it is also possible to perform a call-connection which does not involve such assignment of available alternate routes. An example of such call-connection will be described below with reference to a process flow shown in FIG. 6.

Figure 6:
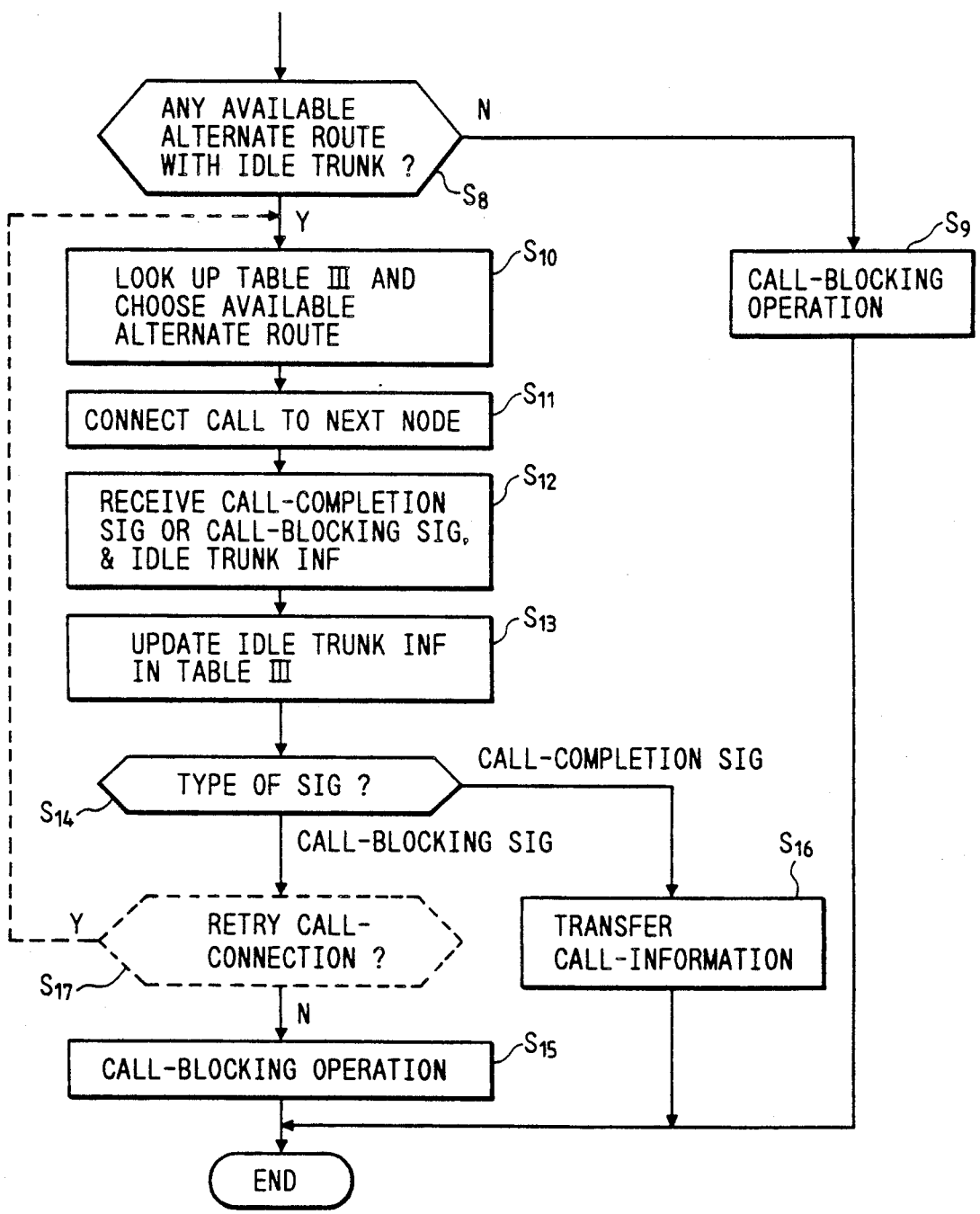
FIG. 6 is a flowchart showing another example of the call-connection procedure in the originating node.

The process flow in FIG. 6 is a process flow of the originating node and steps shown correspond to steps $S_8$ through $S_{22}$ in FIG. 4A. Steps $S_1$ through $S_7$ in the process flow in FIG. 6 are not shown, because they are identical with steps $S_1$ through $S_7$ depicted in FIG. 4A. Furthermore, the process flows of the terminating node and the transit node are the same as the flows shown in FIGS. 4B and 4C, respectively. When no idle trunk is found in the first route in response to a call-connection request, it is checked in step $S_8$ in FIG. 6 whether or not there are available alternate routes which have idle trunks in their outgoing links, and if not, the process ends with the call-blocking operation in step $S_9$. When available alternate routes having idle trunks in their outgoing links are found in step $S_9$, one of such available alternate routes is selected based on the latest trunk-status information (idle-trunk-number information in this example) obtained for each available alternate route, such as shown in Table III in FIG. 7. This is followed by the call-connection operation through the selected available alternate route (i.e. holding an idle trunk and sending the call to the transit node) in step $S_{11}$. In step $S_{12}$ the originating node receives a call-completion or call-blocking signal and idle-trunk-number information from the transit node. In step $S_{13}$ the idle-trunk-number information of the available alternate route selected in step $S_{10}$, shown in Table III in FIG. 7, is updated based on the latest idle-trunk information received from the transit node. In step $S_{14}$ it is checked whether the received signal is a call-completion or call-blocking signal. If the signal is the call-blocking signal, the call-blocking operation is performed in step $S_{15}$, and if the signal is the call-completion signal, the call information is transferred to the next node in step $S_{16}$. In either case, the process ends. If necessary, step $S_{17}$ is provided between steps $S_{14}$ and $S_{15}$ for checking whether or not to retry the call-connection, as indicated by the broken line, and if the call-connection is to be retried, the process returns to step $S_{10}$, repeating the above-mentioned processing.

A description will be given of two typical methods for selecting an available alternate route in step $S_{10}$ of FIG. 6.

According to a first method, for example, the transit node sends idle-trunk information, as the trunk-status information, to the originating node in step $S_{C4}$ in the process flow of FIG. 4C. The idle-trunk information may be the busy/idle trunk-status, the number of idle trunks, or the trunk usage; in this example, the number of idle trunks is used as the idle-trunk information. In step $S_{12}$ in the process flow of FIG. 6, the originating node receives from the transit node the idle-trunk information on the selected available alternate route and, in step $S_{13}$, updates the number of idle trunks corresponding to the available alternate route, shown in Table III of FIG. 7, as described previously. When the process of a call-connection has reached step $S_{10}$, the originating node refers to Table III and selects an available alternate route having the largest number of idle trunks. When there are two or more available alternate routes of the greatest number of idle trunks, one of them is selected randomly, cyclically, or on a predetermined order basis. Also in the case where binary information indicating the busy/idle trunk-status is used as the above-mentioned idle-trunk information, the available alternate route is selected in the same manner as mentioned above.

According to the second method, the idle-trunk information received in step $S_{12}$ in the first method is used to determine the choice probability (described later) of the available alternate route. The choice probability thus determined is stored as shown in Table III of FIG. 7 and this data is updated according to the received idle-trunk information. When the process of the call-connection has reached step $S_{10}$, the originating node refers to Table III of FIG. 7 and selects an available alternate route in accordance with the choice probability determined for each available alternate route. Also in this instance, steps $S_{14}$ through $S_{17}$, $S_{19}$, $S_{20}$ and $S_{22}$ in FIG. 4A are omitted. One possible method for determining the choice probability is as follows:

Where the idle-trunk information is the number of idle trunks, the choice probability of an available alternate route larger in the number of idle trunks is determined to be higher. Assuming that the numbers of idle trunks of the available alternate routes R134, R154 and R164 are 3, 5 and 2 as shown in Table III of FIG. 7, the choice probabilities of these available alternate routes are determined so that $3/(3+5+2)=0.3$, $5/(3+5+2)=0.5$ and $2/(3+5+2)=0.2$, respectively. With this method, however, when the number of idle trunks of any one of the available alternate routes is zero, its choice probability becomes zero and the available alternate route will never be selected; so that a certain number (0.1, for example) is added to each of the above number of idle trunks.

According to the above-mentioned first method for selecting an available alternate route in step $S_{10}$, in each switching node an available alternate route of a larger number of idle trunks at each time point is selected. According to the second method, the probability of the available alternate route of a larger number of idle trunks being chosen increases. Consequently, the throughput of the entire network can be improved because the disturbance of the numbers of idle trunks of all the available alternate routes is decreased.

In steps $S_2$ through $S_{23}$ of the process flow of the originating node shown in FIG. 4A and in their various modifications mentioned above, all alternate routes of the set of available alternate routes are also possible to be assigned. This is substantially equivalent to selecting alternate routes directly from the set of available alternate routes without employing the assignment system. In this case, steps $S_{16}$, $S_{17}$ and $S_{22}$ in FIG. 4A are unnecessary.

It is also possible to employ a method in which the network control center NC handles single-link routes (first routes) and two-link routes (alternate routes) as equally selectable routes without making a distinction between them and determines sets of available routes for each switching node instead of determining sets of available alternate routes. In this instance, the sets of available routes do not always include single-link routes. In the processes shown in steps $S_8$ through $S_{23}$ in FIG. 4A and their aforementioned modified examples the originating node selects a route from the set of available routes by the same processing as described previously and tries a call-connection. FIG. 8 shows an example of the process flow of the call-connection procedure by the originating node. The process flow in FIG. 8 is identical with that in FIG. 4A except that steps $S_2$ through $S_7$ are left out. In step $S_2$ the originating node responds to a call-connection request to select that one of assigned available routes which is not in the unavailable status, thereafter performing the same call-connection procedure as in the case of FIG. 4A. No description will be given of the procedure, for the sake of brevity.

In any of the above-described various route selection algorithms of the present invention for the call-connection procedure of each switching node, assigned available routes in the set of available routes are updated in accordance with their trunk status, by which is increased the probability of selecting an available route which has a large number of idle trunks relative to the other available routes at the time point of occurrence of a call-connection request, and consequently, the call-completion probability is also improved. Moreover, trunk resources of the entire network are used efficiently, and consequently, the network throughput of the entire network increases.

While in the above the transit node has been described to send the trunk-status information to the originating node together with the call-completion or call-blocking signal, the trunk-status information may be sent as a signal independent of the call-completion or call-blocking signal.

Network Control Center

Figure 9:
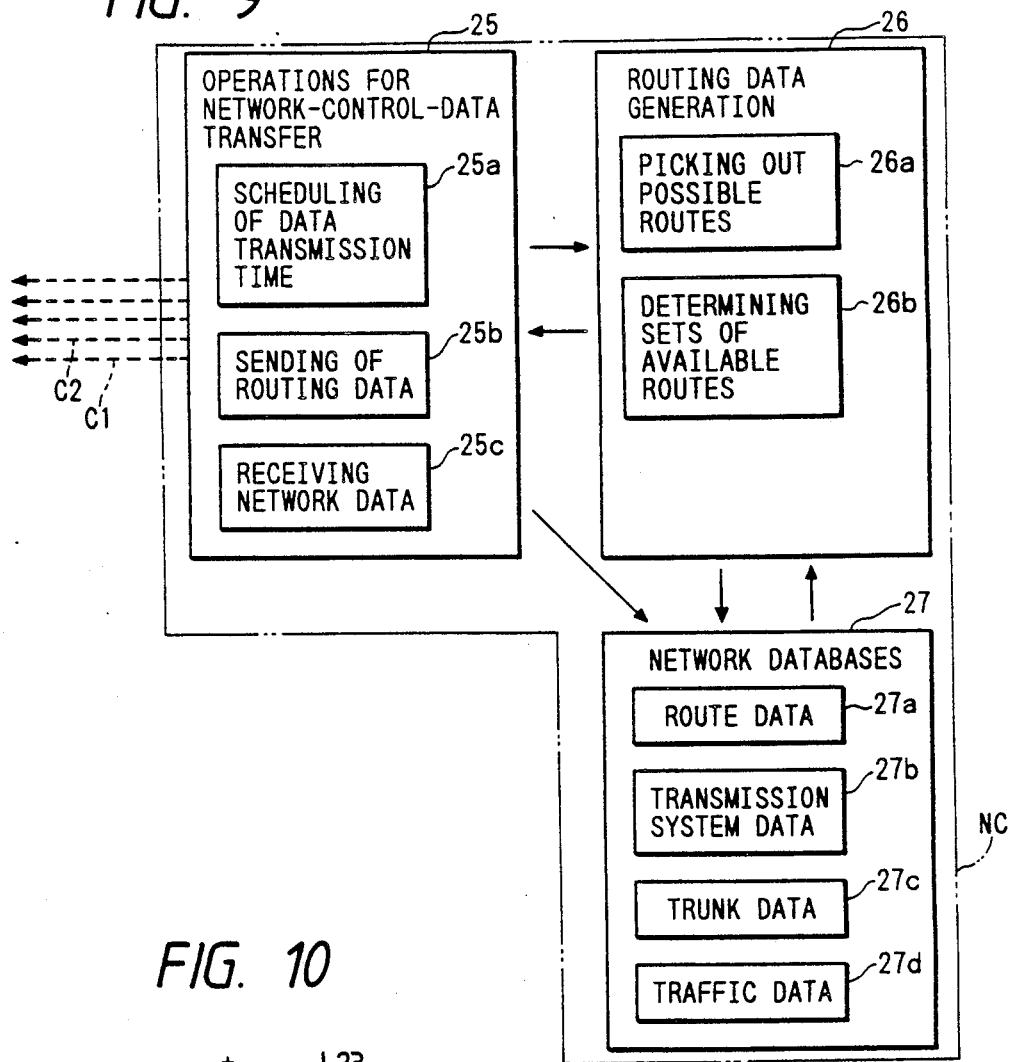
FIG. 9 is a function-block-chart of a network control center of the telecommunications network.

FIG. 9 is a function-block-chart of the network control center NC. The network control center NC performs network-control-data transfer operations 25 for transferring a set of available routes or set of available alternate routes to each switching node at a preset time and routing data generating operations 26 for determining, on the basis of collected data, a set of available routes which are recommended for connecting each switching node-pair and has network databases 27 for preparing the set of available routes.

The network-control-data transfer operations 25 include: a data transmission scheduling operation 25a for scheduling the transmission of a prepared set of available routes to each switching node; a routing data sending operation 25b for sending the sets of available routes at the scheduled time; and a network data receiving operation 25c for receiving network data from each switching node. The routing data generating operations 26 include a possible-route-picking-out operation 26a for picking out all possible routes through which each switching node-pair in the telecommunications network can be connected, and a set-of-available-routes determining operation 26b for selecting a set of preferable available routes from the picked-out possible routes on the basis of the network data such as traffic data and trunk data. The network databases 27 include: route data 27a on the possible routes picked out; transmission system data 27b for managing the transmission system that constitutes the telecommunications network; trunk data 27c for managing the number of trunks of each link; and traffic data 27d for estimating and forecasting the traffic volume which will occur between an originating and a terminating node in the telecommunications network.

The traffic data 27d is used to estimate the traffic volume between originating and terminating nodes in each time zone or slot of a day. The following four methods can be employed for this estimation.

(a) Traffic data obtained in the past is stored and the traffic volume between each originating and terminating node-pair is calculated statistically based on traffic data obtained in the same time zone of observations days having similar attributes. The attributes of the observation day are those which are likely to influence the traffic, such as weekdays, holidays, days preceding and following consecutive holidays, consecutive holidays, seasons, etc., and this estimation is carried out using a multi-variable analysis considering such attributes.

(b) The traffic volume is estimated using a time-series analysis based on periodically observed traffic data.

(c) The traffic volume is estimated by the combined use of the above-mentioned methods (a) and (b).

(d) The traffic volume is estimated and forecast based on the network operator's experience and knowledge.

Based on the traffic volume in each time zone estimated in accordance with the traffic data 27d, the time at which the set of available routes is to be sent is determined by the data transmission scheduling operation 25a. This data transmission time is adaptively changed in accordance with weekdays, holidays, seasons, etc. throughout the year.

The trunk data 27c includes data on the network topology (i.e. the connections between respective switching nodes through links), the number of trunks of each link and first routes between originating and terminating nodes, and similar data on the constitution of the telecommunications network.

For collecting from each switching node the traffic data 27d for observing the traffic volume and the trunk data 27c for updating the trunk-status information of each link, there are a method in which the network control center NC collects the data from each switching node, a method in which the data is transferred from a data collecting system (not shown) provided separately of the network control center NC for implementing the present invention, and a method in which the data is transferred from a dedicated system already employed in the telecommunications network of each country. Such a dedicated system already put into practical use is, for example, a traffic data/trunk-status data collecting system (referred to as ATOMICS (Advanced Traffic Observation and Management Information Collecting System)) used in NTT telecommunications network of Japan. Such a dedicated system and the network control center may also be combined into a network control system.

The following description will be given in connection with the case of producing sets of available alternate routes as the sets of available routes to be sent from the network control center NC to each switching node.

Figure 10:
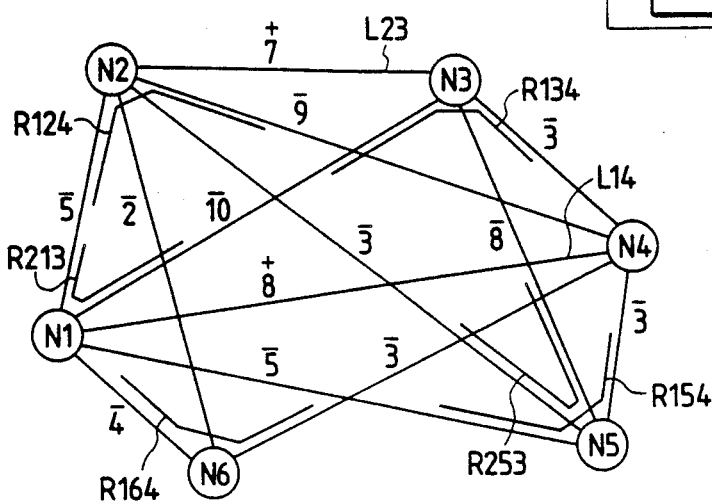
FIG. 10 is a schematic diagram showing an overflow traffic volume or the margin of traffic volume calculated for each link on the basis of the end-to-end traffic volume in the telecommunications network so as to determine a set of available alternate routes for each link.

FIG. 10 shows, by way of example, the traffic conditions in the telecommunications network depicted in FIG. 1. The network control center NC is not shown in FIG. 10. A value added to each link represents, in terms of a margin of traffic volume and an overflow traffic volume, the total traffic volume between each switching node-pair on the assumption that the traffic volume has been offered only to the first route therebetween. The margin of traffic volume and the overflow traffic volume are defined as follows:

Overflow traffic volume: Traffic volume having overflowed from the first route

More Specifically, the overflow traffic volume $O[i,j]$ of the link Lij is defined by the following equation:

$$O[i,j] = A_0[i,j] \cdot E\{A_0[i,j], N[i,j]\}$$

where $A_0[i,j]$ is the offered traffic volume on the link Lij, $N[i,j]$ is the number of trunks of the link Lij, and $E\{*,*\}$ is the Erlang's B equation (or referred to as a loss equation).

Margin of traffic volume: Traffic volume which can be offered until a reference call-connection quality is reached in the case where the first route satisfies the reference call-connection quality The margin of traffic volume $C[i,j]$ of the link Lij is defined by the following equation, for example:

$$C[i,j] = max\{\overline{A}[i,j] - A_0[i,j], 0\}$$

where $\overline{A}[i,j]$ is a value which satisfies $E\{\overline{A}[i,j], N[i,j]\} = B_0$, $A_0[i,j]$ is the basic volume on the link Lij, $B_0$ is a standard of loss probability (usually $B_0 = 0.01$), and max{a,b} is a function which takes a larger one of a and b.

The margin of traffic volume $C[i,j]$ and the overflow traffic volume $O[i,j]$ calculated by the above definitions both take values greater than zero, and these values can be calculated for any link Lij. In general, where either one of the overflow traffic volume and the margin of traffic volume is sufficiently larger, the other assumes a value close to zero. In FIG. 10 only the larger one of the overflow traffic volume and the margin of traffic volume is shown for each link and the value of the other is regarded as zero and is not shown for the sake of brevity. In FIG. 10 the margin of traffic volume is indicated by a symbol "−" on its numerical value and the overflow traffic volume by a symbol "+" on its numerical value.

Now, consider the first route between the switching nodes N1 and N4, i.e. a link L14, and the first route between the switching nodes N2 and N3, i.e. a link L23 in FIG. 10. The overflow traffic volumes from the links L14 and L23 are 8 and 7, respectively, and it is necessary to search available alternate routes for alternate call-connections. The criterion for selecting such an available alternate route is the margin of traffic volume through two links which form the alternate route, and the traffic volume which can be offered to the alternate route is determined by the smaller one of the margins of traffic volume on the two links.

The set-of-available-route determining operation 26b is to determine the set of available routes for each preset time zone by calculating the overflow traffic volume and the margin of traffic volume for each first route based on the trunk data 27c and the traffic data 27d. There are the following criteria for obtaining sets of available alternate routes for all first routes through a heuristic iterative calculation. (a) The traffic volume that is overflowed from all the alternate routes between originating and terminating node pair will hereinafter be referred to as a blocked traffic load. A set of available alternate routes which minimize the blocked traffic load between the originating and terminating node-pair of which the blocked traffic load is maximum are selected. (b) Sets of available alternate routes which maximizes the throughput of the entire network. (c) A set of available alternate routes are selected which maximize the call-completion probability between the originating and terminating node-pair of which the call-connection probability is the worst of all the pairs.

FIG. 11 shows a process flow for determining sets of available alternate routes through a heuristic calculation based on the above-mentioned criterion (a).

In FIG. 11, the process starts with the input of the traffic data 27d and the trunk data 27c in step $S_1$, and in step $S_2$ all alternate routes possible for each link used as the first route are picked out based on the transmission system data 27b and the trunk data 27c. In step $S_3$ a basic traffic volume assignment procedure is performed in which the total traffic volume, which is offered between each originating-terminating node pair in the communications network, is entirely assigned to the first route between the originating-terminating node pair. In the next step $S_4$ the margin of traffic volume and the overflow traffic volume of each link are calculated, followed by selecting a link of the largest overflow traffic volume in step $S_5$. The link thus selected will hereinafter be referred to as a first route. Of all alternate routes for the selected first route, an alternate route of the largest margin of traffic volume through two links is selected in step $S_6$. The alternate route thus selected is stored as an available alternate route corresponding to the first route. Next, in step $S_7$ a unit volume out of the overflow traffic volume from the selected first route is assigned to the available alternate route selected in step $S_6$. In the next step $S_8$ the data of the overflow traffic volume and the margin of traffic volume of each link are recalculated. Steps $S_5$ through $S_8$ are repeated until a required number of available alternate routes are determined for each link.

In step $S_7$ the assignment of unit volume from the overflow traffic volume to the margin of traffic volume can be approximated by a simple method in which the overflow traffic volume from the first route is reduced by the unit volume assigned to the available alternate route and the margin of traffic volume of each link constituting the selected alternate route is decreased by unit volume.

With reference to FIGS. 12A through 12F, a concrete example of sequentially determining available alternate routes by repeating steps $S_5$ through $S_8$ will be described using a simple network model with five switching nodes. Five circles indicate switching nodes N1 to N5. In FIGS. 12A through 12F reference numerals L12, L13, L14, L15, L23, . . . of links which interconnect the switching nodes N1 to N5 are omitted, and reference numerals R132, R142, . . . of two-link routes are also omitted. Let it be assumed that the following rules are applied to the procedure for sequentially determining available alternate routes in this simple model.

Rule 1: Where two or more links of the largest overflow traffic volume are found in Step $S_5$, one of the links, except those for which a required number of available alternate routes have already been determined, is selected randomly.

Rule 2: Where in step $S_6$ a required number of available alternate routes have already been determined for the link selected in step $S_5$, a route is selected from these available alternate routes.

Rule 3: Where in step $S_6$ a required number of available alternate routes have not been determined yet for the link selected in step $S_5$, a route is selected from the available alternate routes already determined.

Rule 4: Where two or more routes of the largest margin of traffic volume are found in step $S_6$, one of them is selected randomly.

Rule 5: Where the overflow traffic volume is smaller than unit traffic volume in step $S_7$, the total overflow traffic volume is assigned to the selected alternate route.

Rule 6: Where the overflow traffic volume 15 is zero in step $S_7$, a traffic volume 0 is assigned to the selected alternate route.

Figure 12C:
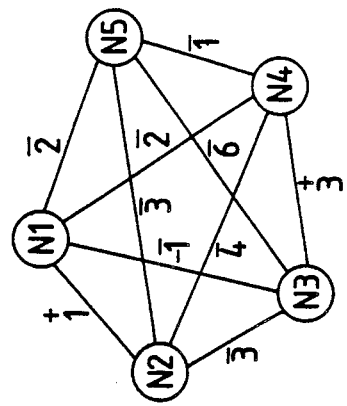
FIGS. 12A through 12F are schematic diagrams showing an example of the procedure for determining the sets of available alternate routes.
Figure 12B:
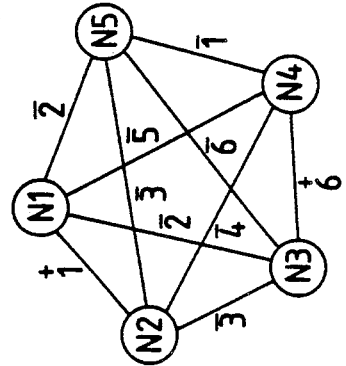
Figure 12A:
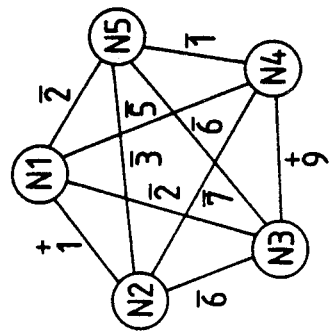

In FIG. 12A the numeral attached to each link represents the margin of traffic volume or overflow traffic volume calculated in steps $S_1$ through $S_4$ of FIG. 11. In the following processing the number of available alternate routes set for each link is 2 for the links L12 and L34 and 0 for the other links, and the unit traffic volume of assignment is 3.

In FIG. 12A, since the link L34 connecting the switching nodes N3 and N4 has the largest overflow traffic volume 9, the link L34 is selected in step $S_5$ of FIG. 11, and since the alternate route for the link L34 which has the largest margin of traffic volume 7 is R324, the route R324 is determined as an available alternate route of the link L34 in step $S_6$. In step $S_7$ a unit volume of 3 out of the overflow traffic volume 9 of the link L34 is assigned to the margins of traffic volume 6 and 7 of the links L23 and L24 which form the route R324. Since the assignment in step $S_7$ is conducted by addition/subtraction in this example, the overflow traffic volume of the link L34 becomes 6 and the margin of traffic volume of the links L23 and L24 becomes 3 and 4, respectively, and the results of the reassignment are such as shown in FIG. 12B.

Then the process returns to step $S_5$, wherein the link L34 is selected, which still has the largest overflow traffic volume 6 in FIG. 12B. In step $S_6$ an alternate route which has the largest margin of traffic volume for the link L34 is selected, and in this case, a route R314 is determined as a second available alternate route of the link L34 in accordance with Rule 3. In step $S_7$ the unit volume 3 of the current overflow traffic volume 6 of the link L34 is assigned to each of the margins 2 and 5 of links L13 and L14 which form the route R134. The results of updating the data in step $S_8$ are such as shown in FIG. 12C.

The process returns to step $S_5$, wherein the link L34 of the largest overflow traffic volume 3 in FIG. 12C is selected, and in step $S_6$ a route which has the largest margin of traffic volume for the link L34 is selected. In this instance, since two available alternate routes have already been determined for the link L34, the route R324 is selected in accordance with the Rule 2. In step $S_7$ the unit volume 3 of the current overflow traffic volume 3 of the link L34 is assigned to each of the margins 3 and 4 of the links L23 and L24 which form the route R324. The results of updating the data in step $S_8$ are such as shown in FIG. 12D.

Figure 12F:
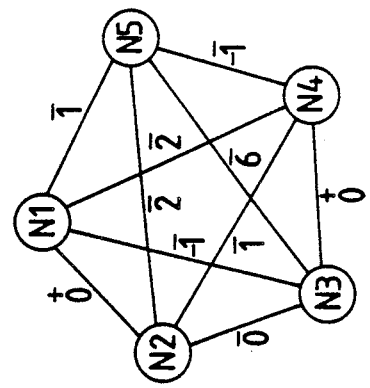
Figure 12E:
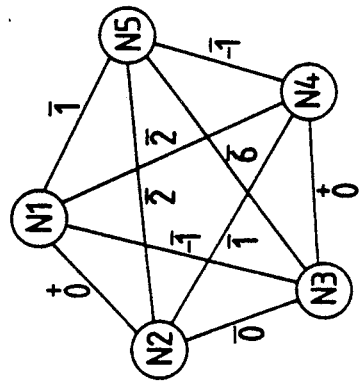
Figure 12D:
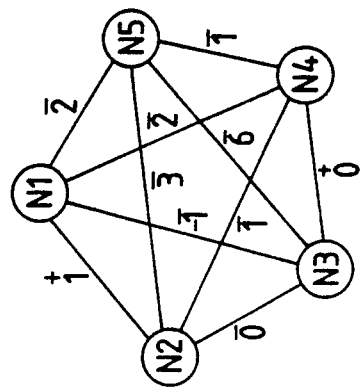

The process returns to step $S_5$, wherein a link L12 of the largest overflow traffic volume 1 in FIG. 12D is selected, and in step $S_6$ a route R152 which has the largest margin of traffic volume for the link L12 is determined as an available alternate route of the link L12. In step $S_7$ the overflow traffic volume 1 of the link L12 is assigned, in accordance with Rule 5, to each of the margins of traffic volume 2 and 3 of the links L15 and L25 which form the route R152. The results of updating the data in step $S_8$ are such as shown in FIG. 12E.

Then the process returns to step $S_5$, wherein the link L12 is selected following Rule 1, and in step $S_6$ the route R152 is determined as a second available alternate route of the link L12 in accordance with Rule 4. In step $S_7$ the overflow traffic volume 0 is assigned to the route R152, following Rule 6. The results of updating the data in step $S_8$ are shown in FIG. 12F (which happens to be identical with FIG. 12E). Thus the two available alternate routes set for the links L12 and L34 are determined, with which the process ends.

If the number of alternate routes is predetermined for each set of available alternate routes as explained above, there is the possibility that all the links with overflow traffic volume or all the alternate routes with the margin of traffic volume are gone before the predetermined number of available alternate routes are determined. In the former case, the unit volume for assignment is reduced so that the overflow traffic volume can be assigned to all available alternate routes. In the latter case, when no alternate route with the margin of traffic volume is found in step $S_6$ in the process flow described above, an alternate route which is the smallest in the overflow traffic volume through two links is selected.

Furthermore, the alternate route which is used for the actual call-connection is selected by the state-dependent adaptive routing which is executed by each switching node, and consequently, if the number of available alternate routes in the set of available alternate routes is selected larger than usual, unpredictable conditions such as a trunk failure and a traffic variation can be dealt with sufficiently.

FIG. 13 shows a process flow for determining a set of available alternate routes by a heuristic iterative calculation which will maximize the entire throughput of the network, referred to previously in item (b). Steps $S_1$ through $S_4$ in this process flow are identical with those shown in FIG. 11, and in these steps the overflow traffic volume and the margin of traffic volume of each link are calculated.

Based on the following rules a possible alternate route of the largest margin of traffic volume is selected in step $S_5$.

Rule 1: Where a required number of available alternate routes have already been obtained for the first route concerning the alternate route, and the overflow traffic volume of the first route is zero or the alternate route concerned is not included in the set of available alternate routes already obtained, the alternate route is not selected.

Rule 2: Where the required number of available alternate routes have not been obtained yet for the first route concerning the alternate route and the overflow traffic volume of the first route is zero and the alternate route concerned is included in the available alternate routes, the alternate route is not selected.

In step $S_6$. The possible alternate route selected in the preceding step $S_5$ is stored as an available alternate route for the first route.

In step $S_7$. The unit volume of the overflow traffic volume from the first route is assigned to the selected possible alternate route.

In step $S_8$: The overflow traffic volume of the first route and the margin of traffic volume of each link on the selected possible alternate route are updated.

The above-mentioned steps $S_5$ through $S_8$ are repeated until the required number of available alternate routes are determined for each link. According to the process flow shown in FIG. 13, since the overflow traffic in the entire network is assigned efficiently so that the margin traffic in the entire network is used up as much as possible, the sets of available alternate routes are determined which maximize the throughput of the network.

Figure 14:
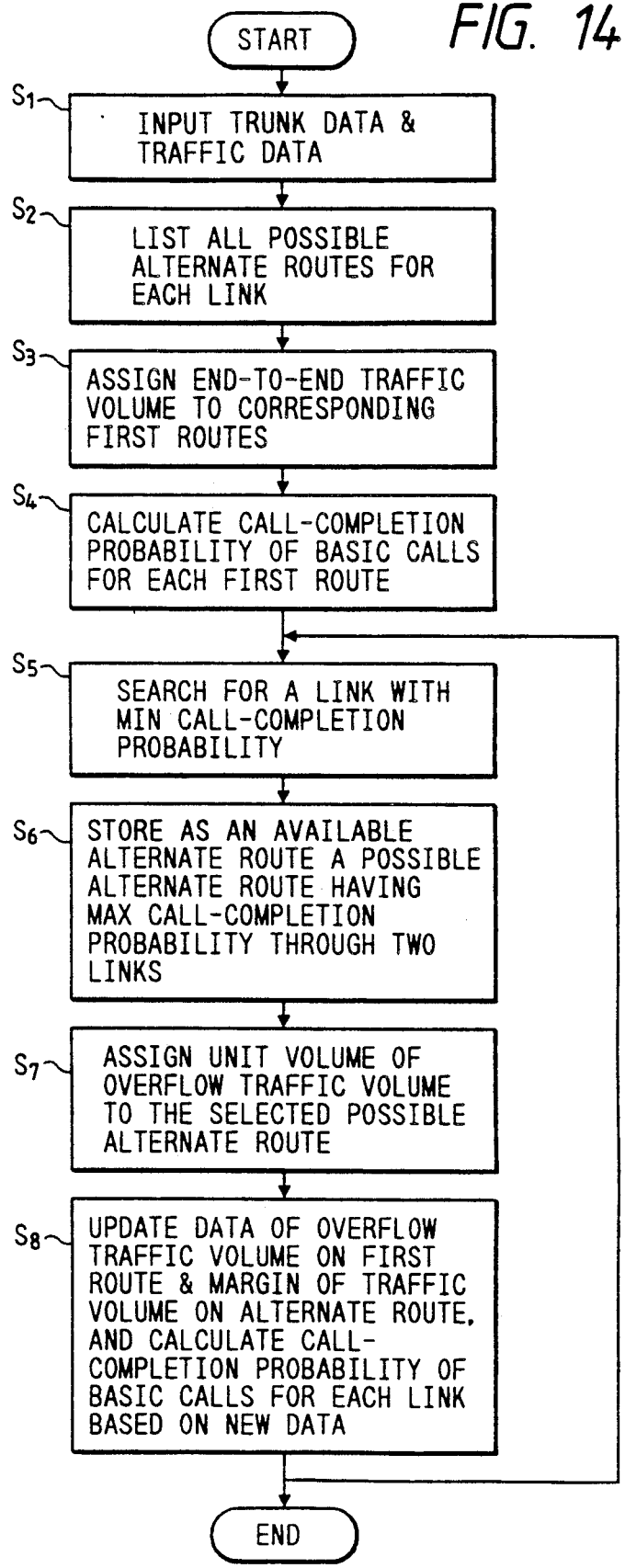
FIG. 14 is a flowchart showing another example of the procedure for determining the sets of available alternate routes.

FIG. 14 shows a process flow for determining the sets of available alternate routes by a heuristic iterative calculation, using as the criterion the call-completion probability mentioned previously in item (c).

In steps $S_1$ through $S_3$ traffic volume is assigned to the first routes between each originating and terminating node-pair in the network on the basis of the traffic data and the trunk data of all links as in the case of FIG. 11. In step $S_4$ the call-completion probability of a basic call is calculated for each link, and the overflow traffic volume and the margin of traffic volume of each link are calculated as in step $S_4$ in FIG. 11. The call-completion probability $\gamma$ of the link Lij is expressed by $\gamma = 1 - B[i,j]$ and the call-blocking probability $B[i,j]$ of the link Lij can be obtained by the following simultaneous equations:

$$A[i,j] = A_0[i,j] + \sum_{j \in R[i,j]} \frac{A_0[i,k] \cdot B[i,k]}{|R[i,j]|} +$$

$$\sum_{j \in R[k,j]} \frac{A_0[k,j] \cdot B[k,j]}{|R[k,j]|}$$

$$B[i,j] = E(A[i,j], N[i,j])$$

where $A[i,j]$ and $A_0[i,j]$ are the offered traffic volume and the basic traffic volume of the link Lij, $R[i,j]$ and $|R[i,j]|$ are the set of available alternate routes and the number of available alternate routes for the link Lij, k is the number representing a transit node Nk, E is the Erlang's B equation, and $N[i,j]$ is the number of trunks of the link Lij.

In the next step $S_5$ a link of the lowest call-completion probability is selected, and in step $S_6$ one of possible alternate routes which has the highest call-completion probability when the selected link is used as the first route is selected as an available alternate route. It is assumed, however, that the call-completion probability of the alternate route is given by the lower one of the call-completion probabilities of the two links which form the alternate route. In step $S_7$ the unit volume of the overflow traffic of the selected link of the lowest call-completion probability is assigned to two links of the above-mentioned alternate route of the highest call-connection probability. In step $S_8$ the traffic volumes which are applied two links of the alternate route are updated based on the assigned traffic volume, and the call-completion probability of the basic call on each of the links is calculated based on the updated traffic volume. Steps $S_5$ through $S_8$ are repeated until a required number of available alternate routes are selected for each link.

As will be appreciated from the first route selecting procedure in step $S_5$ in FIG. 14, the criterion for obtaining an appropriate sets of available alternate routes in this process flow is to determine a set of available alternate routes which minimizes the blocked traffic load between an originating-terminating node pair which is the largest in the traffic volume which cannot be carried by all of the afore-mentioned available alternate routes. In order for all users to utilize the telecommunications network at the same grade of service, it may be desirable to employ a set of available alternate routes which minimizes the call-completion probability between an originating and terminating node-pair which is the lowest in terms of the call-connection quality therebetween as mentioned previously in connection with the process flow shown in FIG. 14.

While in the above a predetermined number of available alternate routes are determined for each link through the heuristic iterative calculation as described previously in respect of FIGS. 11, 13 and 14, it is also possible to determine the set of available alternate routes by continuing the heuristic iterative calculation until a certain condition has been satisfied, instead of predetermining the number of available alternate routes for each link. A description will be given, with reference to FIG. 15, of process flow in which the heuristic iterative calculation is performed for determining the sets of available alternate routes, using the throughput of the network as a criterion.

Figure 15:
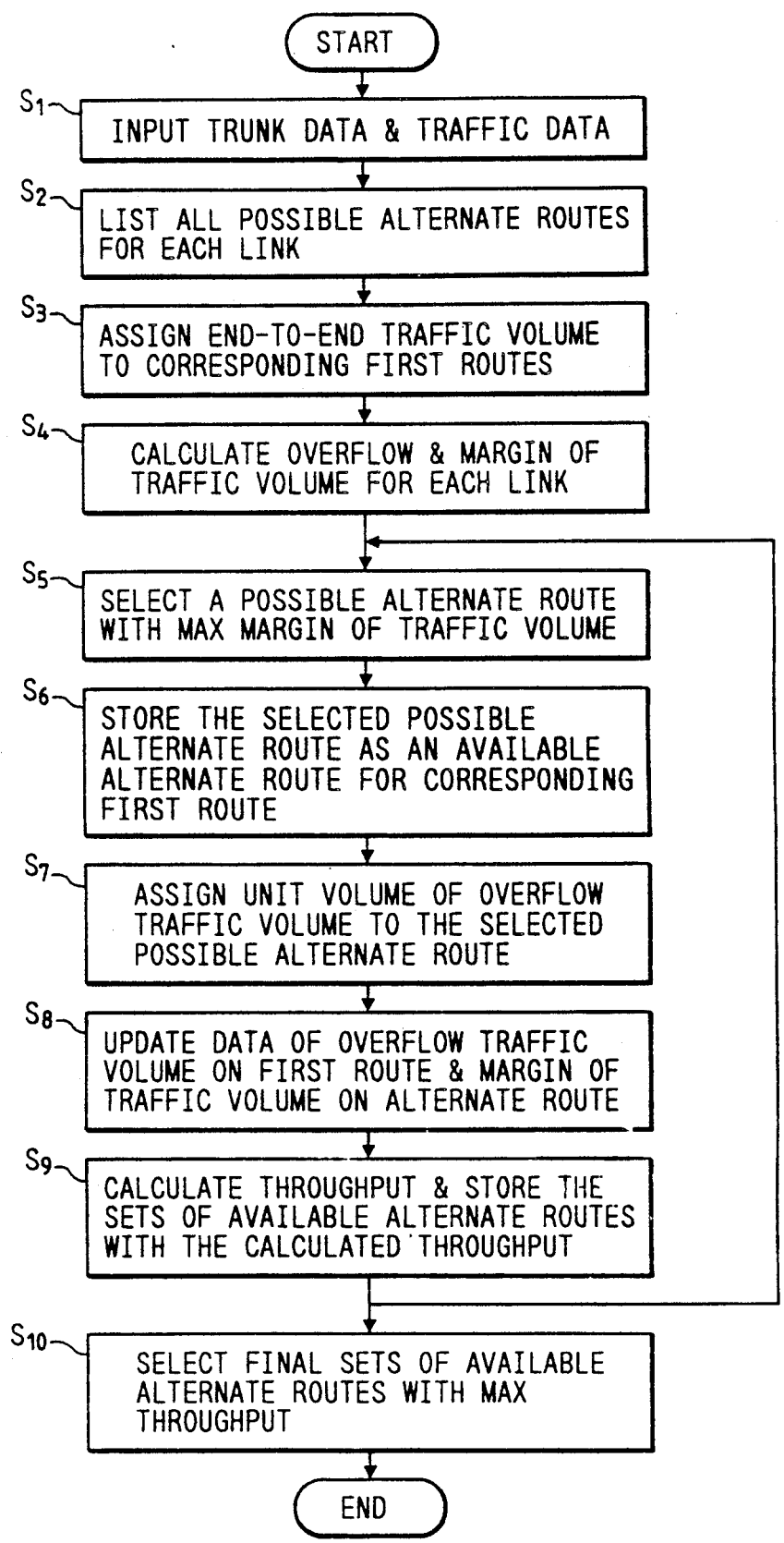
FIG. 15 is a flowchart showing still another example of the procedure for determining the sets of available alternate routes.

In the process flow shown in FIG. 15 steps $S_1$ through $S_4$ are identical with those in FIGS. 11 and 13, and in these steps the overflow traffic volume and the margin of traffic volume are calculated for each link.

In step $S_5$ a possible alternate route of the largest margin of traffic volume is selected as in the case of FIG. 13, but this selection is made following the rule mentioned below.

Rule 1: Where the overflow traffic volume of the first route corresponding to the possible alternate route is zero, the alternate route is not selected. The alternate route selected in step $S_5$ is stored as an available alternate route for the above-mentioned first route in step $S_6$ as in the case of FIG. 13. In the next step $S_7$ the unit volume of the overflow traffic volume from the first route is assigned to the selected alternate route, and in step $S_8$ the overflow traffic volume of the first route and the margin of traffic volume of each link on the selected alternate route are recalculated and updated. In the next step $S_9$ the throughput of the entire network is calculated and its value is stored, at the same time, corresponding to the sets of available alternate routes having already been determined.

Steps $S_5$ through $S_9$ are repeated until the overflow traffic volume of every link is reduced down to zero, and for each repetition of these steps one available alternate route for any one of the links is added and the throughput of the network corresponding to the sets of available alternate routes at that time point is obtained.

When the overflow traffic volumes of all the links are reduced to zero, the process proceeds to step $S_{10}$, in which the largest one of the throughput values, each obtained upon each repetition of steps $S_5$ through $S_9$, is found and the set of available alternate routes determined at the time point at which the largest throughput was obtained is finally determined as the intended set of available alternate routes.

The calculation of the throughput of the entire network in step $S_9$ is conducted by the following method, for instance. Letting $T[i,j]$ represent the carried traffic volume from an originating node Ni to a terminating node Nj, the throughput P is given by the following equation:

$$P = \sum_{i,j \in V} T[i,j]$$

and the carried traffic volume $T[i,j]$ is given by the following equation:

$$T[i,j] = (1 - B[i,j]) \cdot A_0[i,j] +$$

$$\sum_{k \in R[i,j]} \left( \frac{A_0[i,j] \cdot B[i,j]}{|R[i,j]|} \times (1 - B[i,j])(1 - B[k,j]) \right)$$

Here, V is the set of switching node in the network, $B[i,j]$ is the call-blocking probability of the link Lij, $A_0[i,j]$ is the basic traffic volume on the link Lij, $R[i,j]$ is the set of available alternate routes of the link Lij, |R[i,j]| is the number of available alternate routes, and k is the number indicating a transit node Nk.

Figure 16:
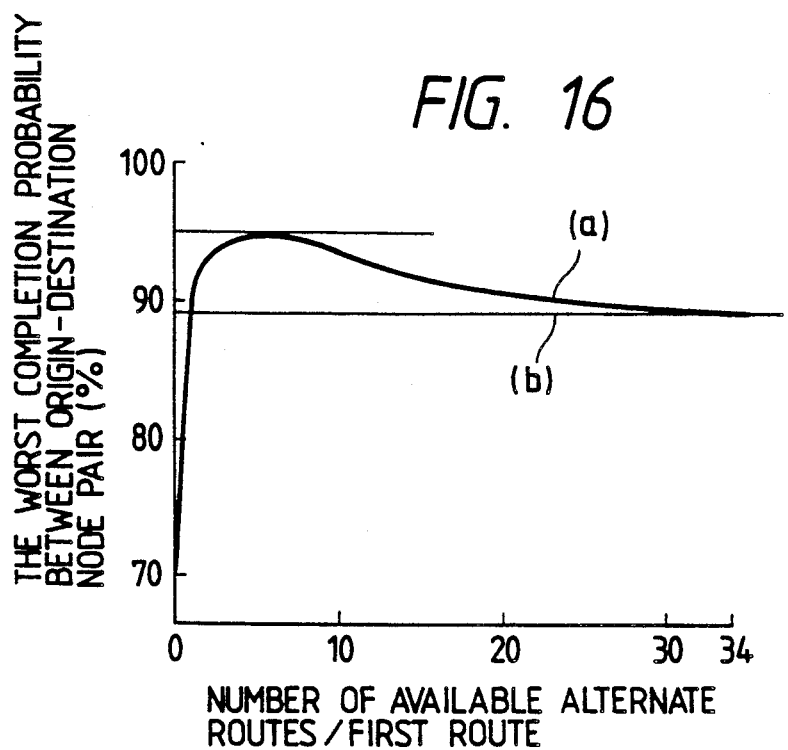
FIG. 16 is a graph showing the number of available alternate routes in each set and the call-completion probability, for explaining the effect of the present invention.
Figure 17:
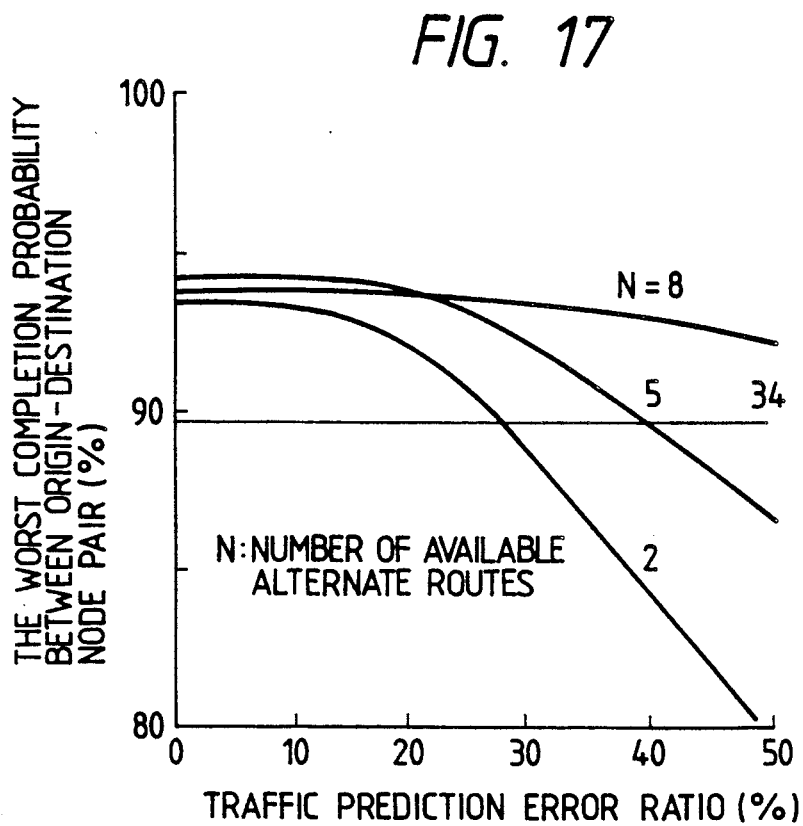
FIG. 17 is a graph showing the relationship between calculated traffic forecasting errors and the call-completion probability, for explaining the effect of the present invention.

FIGS. 16 and 17 are simulation results respectively showing the call-completion probability against the number of available alternate routes and the adaptability to actual traffic variations using the model in which the set of available alternate routes were picked out following the process flow shown in FIG. 11.

In FIGS. 16 and 17 there are shown the results of computer-simulation in the case where the state-dependent dynamic routing was performed using the set of available alternate routes picked out following the processing procedure of the network control center. The network model used for the evaluation is a mesh network with 36 switching nodes, in which a designed traffic volume between each originating-terminating node-pair is 30 erl and the offered traffic volume therebetween is 30 erl on the average; hence the network is set in an unbalanced traffic condition in which the traffic volume is randomly set based on the unit distribution. Consequently, first routes of large overflow traffic and first routes of large margin of traffic volume are distributed with each other in the network.

The vertical axis in FIG. 16 represents the worst call-completion probability between the origin-destination node pair, and the horizontal axis represents the number of available alternate routes provided equally for each first route. In FIG. 16 the characteristic (a) is obtained in the case where a limited number of available alternate routes were provided for each switching node in accordance with the procedure of the present invention and the characteristic (b) is obtained in the case where all alternate routes were applied to each switching node, that is, in the case of the conventional state-dependent dynamic routing by centralized control in each switching node. From the results, it is found that the call-completion probability in the case of limiting the number of available alternate routes is higher. Moreover, since the characteristic (a) varies gently with an increase in the number of available alternate routes, the number of available alternate routes can be determined within the range in which the maximum level of (a) is maintained. As a result of this, it is possible to enhance adaptability to unpredictable conditions such as a traffic prediction error and a trunk failure.

FIG. 17 shows the capability of maintaining performance in an unpredictable condition such as the above-mentioned traffic prediction error or trunk failure, that is, against a prediction error. The vertical axis represents the worst call-completion probability between the, origin-destination node pair, and the horizontal axis represents a traffic prediction error ratio between an origin-destination node pair which is used for picking out the sets of available alternate routes, that is, an error ratio between the actual traffic volume and the predicted one. When the number of available alternate routes is too small or too large, the level of the call-completion probability lowers, yet, when the number of available alternate routes is too large, the capability of maintaining performance against the prediction error improves, because it is difficult to be affected by the traffic prediction error. In other words, it is seen that when the number of available alternate routes is 8, the call-connection probability is sufficiently high and the capability of maintaining performance under equipment failure is also sufficiently high as shown in FIG. 17.

In the FIGS. 11, 13, 14 and 15 the process of determining the set of available alternate routes in the network control center NC a plurality of routes between each originating-terminating node-pair are divided into the process of determining the first route which has high priority and the process of determining alternate routes which are used when the traffic volume of the first route overflows, but the present invention can be applied, of course, to the method to determine a set of available routes from the routes between the origin-destination nodes, without dividing them into the first route and alternate routes. As for the process flow in this case, assuming that a virtual first route having no idle trunk is provided between each node-pair separately of all possible routes including a single-link route, the procedure for assigning traffic to the first route in step $S_3$ in the process flow of FIG. 11 can be implemented by assigning to the virtual first routes the traffic offered between the node pair. The procedure for selecting the link of the largest overflow traffic volume in step $S_5$ can also be implemented by selecting that one of the virtual first routes which has the largest overflow traffic volume.

Although in the above the routing control method of the present invention has been described as being applied to a telecommunications network, the routing control method of the present invention can be applied as well to a telecommunications network in which links connected via a communications satellite (hereinafter referred to as communications satellite links) can be selected as alternate routes. An example of such a telecommunications network will be described with reference to FIG. 18.

Figure 18:
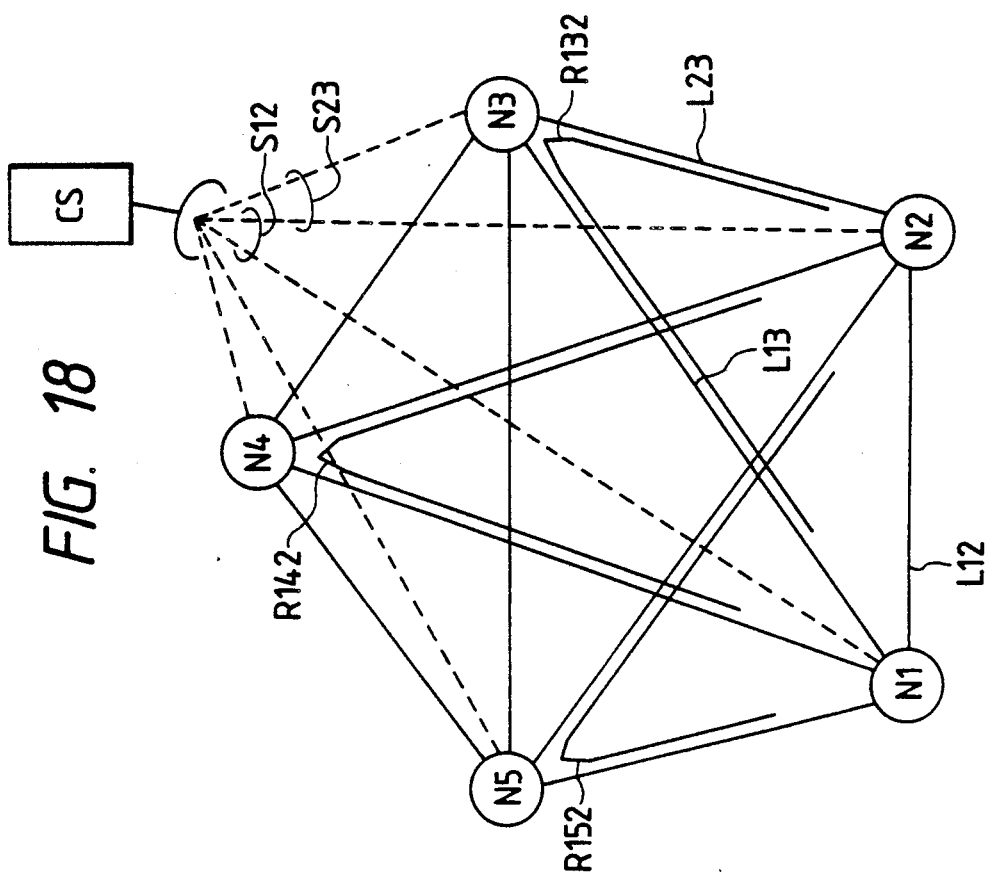
FIG. 18 is a schematic diagram showing a telecommunications network including a communications satellite link to which the routing control method of the present invention can be applied.

In FIG. 18 five switching nodes N1 through N5 are interconnected via links L12, L13, L14, L23, ... (which are referred to also as ground links), and each switching node can be connected to the other switching nodes via a communications satellite CS by communications satellite links S12, S13, ... indicated by the broken lines. For the sake of clarity, no network control center is shown. In the communications network containing the links for interconnecting the switching nodes via the communications satellite, a communications satellite link is used as an alternate route for trying a call-connection only in the case where each cannot perform the call-connection via the first route and no idle trunk is found in any outgoing ground links of currently assigned available alternate routes. Assume, for example, that the switching nodes N1 and N2 are an originating and a terminating nodes, respectively, and routes R132 and R142 are the currently assigned available alternate routes. Where no idle trunk is found in the first route L12 and no idle trunk is found in either of the alternate routes R132 and R142, the process passes through, for example, steps $S_8$, $S_9$, $S_{20}$ and $S_{21}$ of FIG. 4A twice and through steps $S_{24}$ and $S_{22}$ and then reaches step $S_{25}$ indicated by the broken line. If it is determined in step $S_{25}$ to retry the call-connection, the process does not return to step $S_2$ but instead it is checked whether a trunk is idle in the communications satellite link $S_{12}$, and if so, the call is connected to the communications satellite link $S_{12}$, after which the same processing as in steps $S_4$ through $S_7$ are performed. If no idle trunk is found in the communications satellite link $S_{12}$, the process ends with the call-blocking operation.

Figure 19:
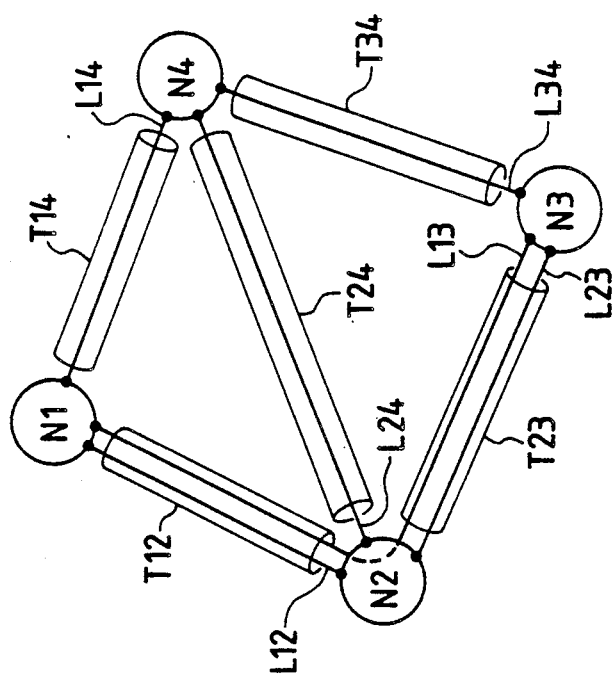
FIG. 19 is a schematic diagram for explaining the relationship between a transmission network and communication links in the telecommunications network.

Incidentally, transmission systems are not always different with the first route which directly connects two switching nodes in telecommunications networks are not always formed by a transmission system independent from other links. For example, links L12, L13, L14, L23, L24 and L34 which connect four switching nodes N1, N2, N3 and N4 in FIG. 19 each form the first route, but the link L13 is accommodated in the same hardware transmission systems T12 and T23 as the links L12 and L23. In this instance, however, the link L13 only passes through the switching node N2 and the switching node N2 does not perform the call-connection. When a failure occurs in the transmission system T12 or T23 in such a transmission network, no call-connection is possible even if a certain route is selected from the links L12 and L23 as an alternate route for the link L13 which is the first route. In this case, by including in the set of available alternate routes in advance, as additional alternate routes, links L14 and L34 accommodated in transmission systems T14 and T34 different from those systems T12 and T23 in which the link L13 is accommodated, it is possible to avoid a serious problem of making both of the first route and its alternate routes unavailable, even if a failure occurs in the transmission system T12 or T23. To this end, the network control center may include such significant alternate routes in the set of available, alternate routes in advance, or each switching node may include such significant alternate routes in the set of available alternate routes received from the network control center. The different transmission systems herein mentioned include transmission systems different in a wide sense, such as systems installed using physically different cables passing through different places, a ground transmission system and a communications satellite system, a digital transmission system and an analog transmission system, or a wire transmission system and a radio transmission system.

Although in the above each first route is defined by one link which connects two switching nodes, it may also be defined by a predetermined number of links which connect the two switching nodes. In such an instance, one or more transit nodes are contained in the first route, and two-link alternate routes are defined for each link which constitutes the first route. Also in such a telecommunications network the process flow by each switching node may be substantially the same as the process flow shown in FIG. 4A, for example, and the process flows in the other embodiments may also be used.

As will be appreciated from the description given so far, the present invention has such advantages as follows:

(i) The sets of available alternate routes are sent from the network control center to each switching node, but since the alternate route to be used according to the real-time network status is selected under distributed control of the switching node, the frequency of control between the network control center and the switching node can be reduced markedly as compared with the frequency needed in the state-dependent adaptive routing placed under centralized control of the network control center. The traffic in Japan, for instance, reaches its peak in substantially the same time zone all over the country and two or three times a day. Accordingly, the set of available alternate routes sent from the network control center needs only to be prepared in accordance with the traffic volume in the peak time, and the traffic volume decreases in other time zones as a whole, and hence can be dealt with within the range of the sets of available alternate routes provided in the peak time zone. As a result of this, the sets of available alternate routes needs only to be sent from the network center to each switching node two or three times a day. Furthermore, even if the network control center does not function because of a failure, the switching node searches for the second-best route through use of the set of available alternate routes provided so far, thereby implementing a highly reliable system.

(ii) According to the present invention, since each switching node performs the state-dependent adaptive routing, idle trunks of links in the network which result from traffic variations or mismatching of trunk resources can be utilized more efficiently than in the case of the time-dependent adaptive routing system.

(iii) According to the present invention, since the range of search for routes, i.e. the set of available alternate routes, is limited taking into account the traffic assignment throughout the network, the number of routing failures by each switching node until finding an appropriate route is smaller than in the case of the conventional state-dependent adaptive routing by each switching node. This affords reduction of the amount of the processing by the switching node, and in the case of employing a method in which a call is handled as a blocked call when call-connection is failed in alternate routes, its completion probability can be improved.

(iv) In the state-dependent adaptive routing by each switching node, the node usually manages data on the set of available alternate routes for each first route. In the present invention, however, since the number of available alternate routes is limited, the amount of data to be managed is smaller than in the case of managing the data on alternate routes throughout the network. Moreover, it is necessary to observe the network conditions, from the point of a network operation, such a condition as the transit-call-completion probability in an alternate route for each link on the first route. Also in this case, the present invention reduces the number of counters for measurement and the amount of measured data to be processed, because the number of available alternate routes is limited.

As described above, according to the present invention, the network control center limits the route-search range, taking into account the traffic conditions and the trunk status, and the sets of available alternate routes are sent to each switching node, and each node performs the state-dependent adaptive routing within the range of the sets of available alternate routes. This permit effective use of the idle network resources which result from traffic variations and mismatching of network resources. Moreover, the frequency of control between the network control center and each switching node can be reduced as compared with the frequency of control in the state-dependent adaptive routing under centralized control of the network control center. The number of routing failures until finding an appropriate route by each switching node is smaller than in the case of the state-dependent adaptive routing by the switching node. Besides, the amount of data to be managed in each switching node, the number of counters and the amount of measured data to be processed in the switching node are smaller than in the case of managing data on all routes in the telecommunications network.

It will be apparent that many modifications and variations may be effected without departing from the scope of the novel concepts of the present invention.

What is claimed is:

1. An adaptive routing control method for a telecommunications network in which a plurality of switching nodes are interconnected via links each composed of a plurality of trunks, one or more routes formed by one or more of said links are provided between each node pair made up of two arbitrary ones of said switching nodes, and at least one network control center is connected via a control signal link to each of said switching nodes, said method comprising:

- a step wherein said network control center adaptively determines, for each said node pair, a set of available routes composed of routes which are set available based on the traffic volume in said telecommunications network and the trunk status of said links;
- a step wherein said network control center sends said set of available routes to each switching node of each said node pair;
- a step wherein each said switching node receives and stores said set of available routes sent from said network control center;
- a step wherein each said switching node responds to each call-connection request to select one of said routes from said set of available routes and perform a call-connection procedure based on trunk-status information obtained with respect to the most recent call-connections through respective said routes;
- a step wherein, when a call requesting said switching node for connection is a call to a transited from one of the other switching nodes which is the originating node of the call to another of said switching nodes which is the terminating node of said call, said switching node acts as a transit node, is connected to said terminating node, and transfers to said originating node trunk-status information of said link which constitutes said selected available route; and
- a step wherein upon each reception of said trunk-status information corresponding to said selected available route, said originating node stores and updates said trunk-status information.

2. The method of claim 1 further comprising a step wherein said network control center updates said sets of available routes at a predetermined time and sends said updated sets of available routes to each said switching node.

3. The method of claim 1 wherein each said set of available routes is a set of available alternate routes, composed of one or more alternate routes for a first route which is a predefined one of said routes between each said node pair, and further comprising a step wherein each said switching node responds to each said call-connection request to try to find an idle trunk in said first route preferentially, and a step wherein when having failed in finding an idle trunk in said first route, each said switching node tries to find an idle trunk in one of said alternate routes in said set of available alternate routes.

4. The method of claim 1, 2, or 3 wherein said set of available routes is determined in a manner to satisfy at least one of the following three conditions:

(a) letting a traffic volume overflowing from each said set of available routes be identified as a blocked traffic load, said blocked traffic load between one of said switching node pairs which is larger than said blocked traffic load between any other switching node pairs is minimized approximately;

(b) the throughput throughout said telecommunications network is maximized approximately; and (c) a call-completion probability between one of said switch-node pairs which is lower than a call-completion probability between any other node pairs is maximized approximately.

5. The method of claim 3 wherein said network control center includes in said set of available alternate routes for each said first route at least one of alternate routes accommodated in a transmission system different from that in which said first route is accommodated.

6. The method of claim 3 wherein each said switching node adds to said set of available alternate routes at least one of alternate routes accommodated in a transmission system different from that in which said first route is accommodated.

7. The method of claim 1 wherein said step of selecting one of said routes from said set of available routes and performing a call-connection by each said switching node includes a step of preselecting one or more available routes from each said set of available routes and assigning said preselected available routes, and a step of responding to a request for the connection of a call to select said one route from said assigned available routes and perform said call-connection procedure.

8. The method of claim 7, further including a step wherein as a result of said call-connection procedure using said selected one of said assigned available routes, at least one more available route is selected from said set of available routes and assigned if one of the following three conditions is satisfied: (a) said call could not be connected, (b) said call could be connected but all trunks in said selected one route have become busy, and (c) said call could be connected but the number of idle trunks remaining in said selected one route has become smaller than a predetermined value.

9. The method of claim 1 wherein said step of selecting one of said routes from said set of available routes and performing a call-connection procedure by each said switching node includes a step of preselecting one or more available routes from said set of available routes and assigning said preselected available routes, and a step of responding to said request for the connection of a call to select a currently available one of said assigned available routes.

10. The method of claim 9 further comprising a step wherein when said trunk-status information received by said originating node indicates a high possibility of a call being blocked in said link connected to said terminating node, said originating node sets said assigned available routes including said link unavailable for a predetermined period of time.

11. The method of claim 10 further comprising a step wherein when the number of those of said assigned available routes which are not unavailable becomes smaller than a predetermined value, said switching node cancels the assignment of at least said assigned available routes having been set unavailable and newly assigns those of said available routes which are assignable.

12. The method of claim 11 further comprising a step of inhibiting the assignment of said assignment-canceled available routes for a predetermined period of time.

13. The method of claim 9 further comprising a step wherein when said trunk-status information received by said originating node indicates a high possibility of a call being blocked in said link connected to said terminating node, said originating node cancels the assignment of said assigned available routes including said link and inhibits their reassignment for a predetermined period of time, and a step wherein said originating node assigns one of said available routes which are assignable, in place of said assignment-canceled available routes.

14. The method of claim 12 or 13 wherein said predetermined period of time for which the assignment of said assignment-canceled available routes is inhibited is a fixed period of time.

15. The method of claim 12 or 13 wherein said predetermined period of time for which the assignment of said assignment-canceled available routes is inhibited is determined on the basis of said trunk-status information.

16. The method of claim 9 further comprising a step wherein when no idle trunk is found in an outgoing link constituting said assigned available route selected by each said switching node in response to said call connection request, said selected assigned available route is set unavailable for a predetermined period of time.

17. The method of claim 16 further comprising a step wherein when no idle trunk is found in said outgoing link constituting said selected assigned available route, each said switching node repeats said call-connection procedure, using one of the other assigned available routes which are not in an unavailable status.

18. The method of claim 16 or 17 further comprising a step wherein when all of said assigned available routes are unavailable, said switching node cancels their assignments and newly assigns those of said available routes which are assignable, 19. The method of claim 17 further including a step of inhibiting assignment of said assignment-canceled available routes for a predetermined period of time.

20. The method of claim 10 wherein said predetermined period of time for which said assigned available routes are set unavailable is based on the time at which said originating node receives said trunk-status information.

21. The method of claim 10 wherein said switching node for transiting said call transfers the time of observation of the trunk status of said link to said originating node together with said trunk-status information, and based on said received observation time, said originating node sets said assigned available routes unavailable for said predetermined period of time.

22. The method of claim 20 or 21 wherein said predetermined period of time for which said assigned available routes are set unavailable is determined in accordance with said trunk-status information.

23. The method of claim 20 or 23 wherein said predetermined period of time for which said assigned available routes are set unavailable is a fixed period.

24. The method of claim 9 further comprising a step wherein said switching node for transiting said call performs a procedure for connecting said call to said trunk of said link which constitutes said selected assigned available route and is connected to said terminating node, receives from said terminating node a response signal indicating the completion or blocking of said call and sends said response signal to said originating node.

25. The method of claim 24 wherein said switching node for transiting said call appends said trunk-status information to said response signal and sends them to said originating node.

26. The method of claim 24 wherein said switching node for transiting said call sends said trunk-status information to said originating node separately of said response signal.

27. The method of claim 1 wherein said step of selecting one of said available routes includes a step of determining the choice probability of each of said available routes based on the trunk-status information thereof, and a step of selecting one of said available routes based on said choice probability.

28. The method of claim 1 wherein said trunk-status information is the number of idle trunks of each of said links and that one of said available routes which is selected has the largest number of idle trunks.

* * * * *